United States Patent
Nagano et al.

(10) Patent No.: US 11,275,498 B2
(45) Date of Patent: Mar. 15, 2022

(54) INFORMATION PROCESSING SYSTEM, INFORMATION PROCESSING METHOD, AND PROGRAM

(71) Applicant: SONY CORPORATION, Tokyo (JP)

(72) Inventors: Kae Nagano, Tokyo (JP); Tetsuo Ikeda, Tokyo (JP)

(73) Assignee: SONY CORPORATION, Tokyo (JP)

(*) Notice: Subject to any disclaimer, the term of this patent is extended or adjusted under 35 U.S.C. 154(b) by 4 days.

(21) Appl. No.: 16/321,267

(22) PCT Filed: Jul. 19, 2017

(86) PCT No.: PCT/JP2017/026095
§ 371 (c)(1),
(2) Date: Jan. 28, 2019

(87) PCT Pub. No.: WO2018/042923
PCT Pub. Date: Mar. 8, 2018

(65) Prior Publication Data
US 2019/0163342 A1    May 30, 2019

(30) Foreign Application Priority Data
Aug. 31, 2016  (JP) .............................. JP2016-168775

(51) Int. Cl.
*G06F 3/0488* (2013.01)
*G06F 3/042* (2006.01)
(Continued)

(52) U.S. Cl.
CPC .............. *G06F 3/0488* (2013.01); *G06F 3/01* (2013.01); *G06F 3/042* (2013.01); *G06F 3/0425* (2013.01);
(Continued)

(58) Field of Classification Search
CPC ........ G06F 3/01; G06F 3/0354; G06F 3/0393; G06F 3/042; G06F 3/0425; G06F 3/0481;
(Continued)

(56) References Cited

U.S. PATENT DOCUMENTS 9,007,481 B2 * 4/2015 Hasegawa .......... G06K 9/00355
348/222.1
9,256,292 B2 * 2/2016 Fujiwara ................. G06F 3/017
(Continued)

FOREIGN PATENT DOCUMENTS

JP    2010-055511 A    3/2010
JP    2010-108011 A    5/2010
(Continued)

*Primary Examiner* — Afroza Chowdhury
(74) *Attorney, Agent, or Firm* — Paratus Law Group, PLLC

(57) ABSTRACT

There is provided an information processing system, an information processing method, and a program capable of changing a process to be executed in response to a recognition result of an inclination of a hand with respect to an object. The information processing system includes: an acquisition unit configured to acquire a recognition result of an inclination of a hand with respect to an object when it is recognized that the hand is touching the object; and a change unit configured to change a value of a parameter related to a process to be executed on the basis of the recognition result.

20 Claims, 33 Drawing Sheets

(51) Int. Cl.
    *G06F 3/0481* (2013.01)
    *G06F 3/01* (2006.01)
    *G06F 3/04847* (2022.01)

(52) U.S. Cl.
    CPC ........ *G06F 3/04847* (2013.01); *G06F 3/0481* (2013.01)

(58) Field of Classification Search
    CPC . G06F 3/04847; G06F 3/0488; G06F 3/04883
    See application file for complete search history.

(56) References Cited

U.S. PATENT DOCUMENTS

| | | | | |
|---|---|---|---|---|
| 2009/0051660 | A1* | 2/2009 | Feland, III | G06F 3/04883 345/173 |
| 2010/0225604 | A1* | 9/2010 | Homma | G06F 3/044 345/173 |
| 2011/0018825 | A1* | 1/2011 | Kondo | G06F 3/0433 345/173 |
| 2012/0314902 | A1* | 12/2012 | Kimura | G06K 9/00355 382/103 |
| 2013/0009896 | A1* | 1/2013 | Zaliva | G06F 3/044 345/173 |
| 2013/0265218 | A1* | 10/2013 | Moscarillo | G06F 3/017 345/156 |
| 2014/0184558 | A1* | 7/2014 | Midholt | G06F 3/0446 345/174 |
| 2014/0292723 | A1* | 10/2014 | Suzuki | G06F 3/04883 345/175 |
| 2014/0327611 | A1* | 11/2014 | Ono | G06F 3/0425 345/156 |
| 2015/0029145 | A1* | 1/2015 | Hlatky | G06F 3/0488 345/174 |
| 2015/0084930 | A1* | 3/2015 | Watanabe | G06F 3/0425 345/175 |
| 2015/0268730 | A1* | 9/2015 | Walline | G06F 3/017 345/168 |
| 2016/0011720 | A1* | 1/2016 | Walther | G06F 3/04847 345/173 |
| 2016/0012599 | A1* | 1/2016 | Kuboyama | G06F 3/017 348/348 |
| 2016/0132121 | A1* | 5/2016 | Murase | G06F 3/0416 345/156 |
| 2016/0210039 | A1* | 7/2016 | Suggs | G06F 3/0421 |
| 2016/0210950 | A1* | 7/2016 | McPherson | G06F 3/04883 |
| 2016/0274733 | A1* | 9/2016 | Hasegawa | G06F 3/048 |
| 2016/0349925 | A1* | 12/2016 | Kamamori | G06F 3/04883 |
| 2016/0364007 | A1* | 12/2016 | Kamovich | G06F 3/0488 |
| 2016/0378251 | A1* | 12/2016 | Aznoe | G06F 3/04812 345/158 |
| 2017/0083145 | A1* | 3/2017 | Ichikawa | G06F 3/04883 |

FOREIGN PATENT DOCUMENTS

| | | |
|---|---|---|
| JP | 2011-511379 A | 4/2011 |
| JP | 2012-104107 A | 5/2012 |
| JP | 2012-203879 A | 10/2012 |
| JP | 2014-032506 A | 2/2014 |
| JP | 2014-149815 A | 8/2014 |

* cited by examiner

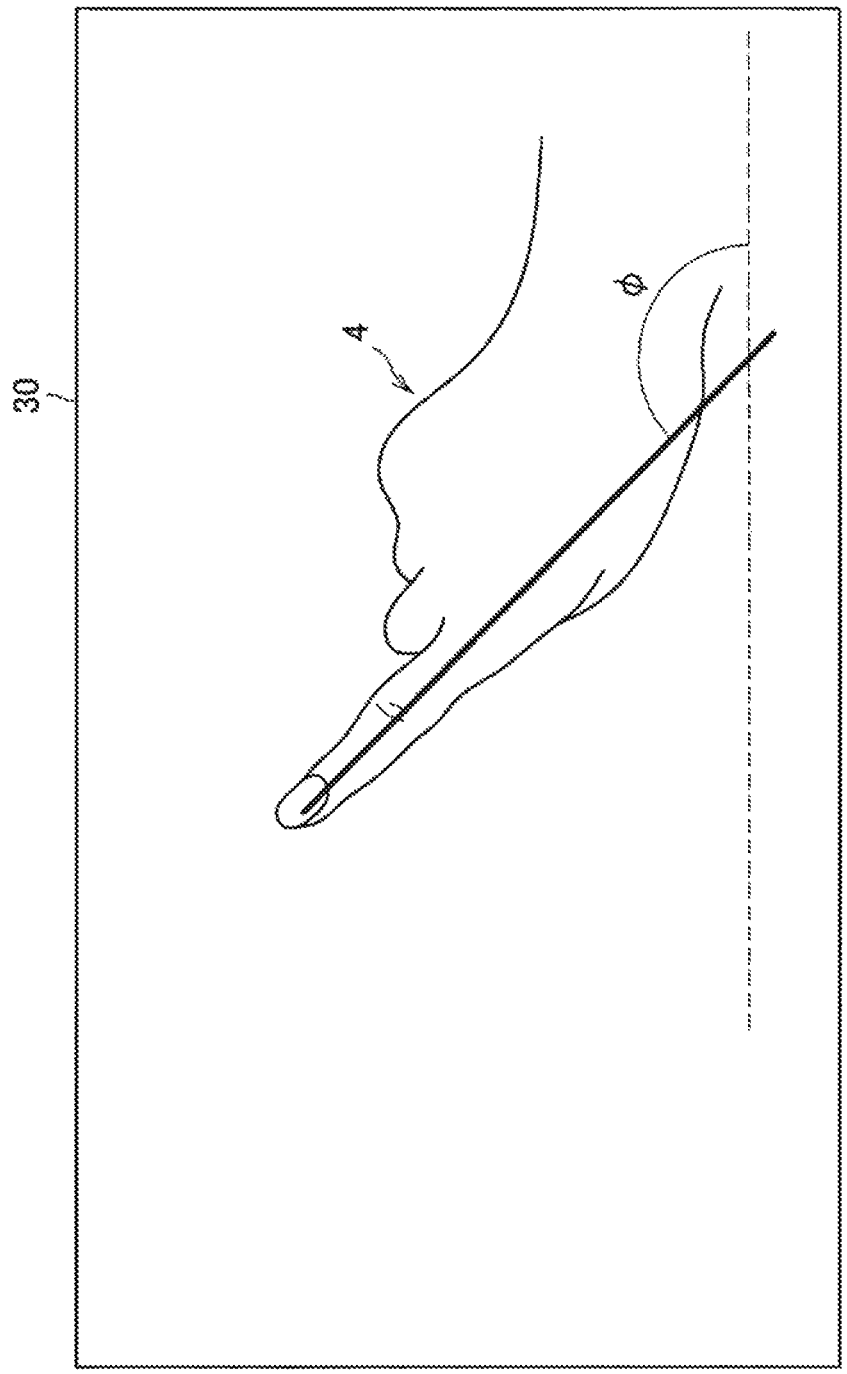

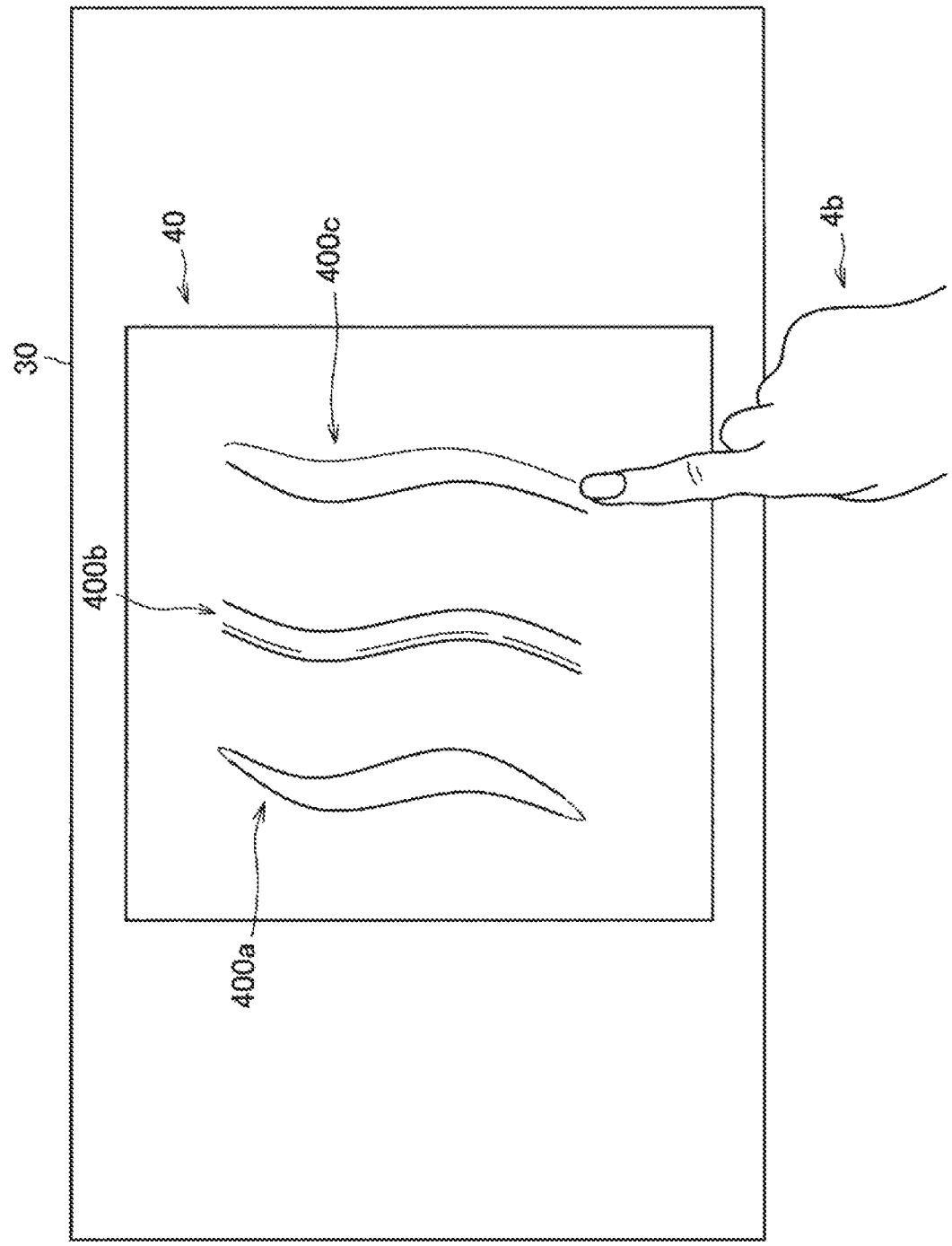

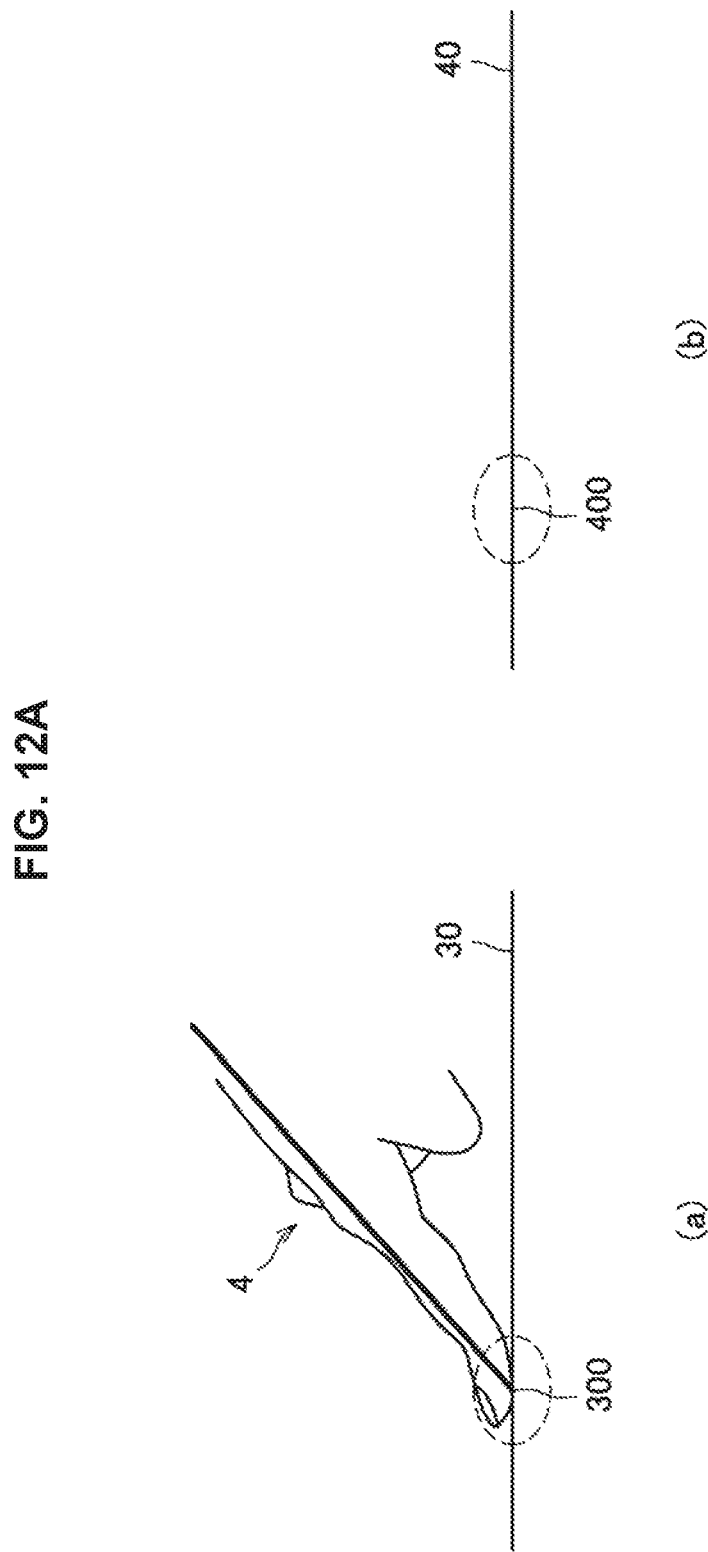

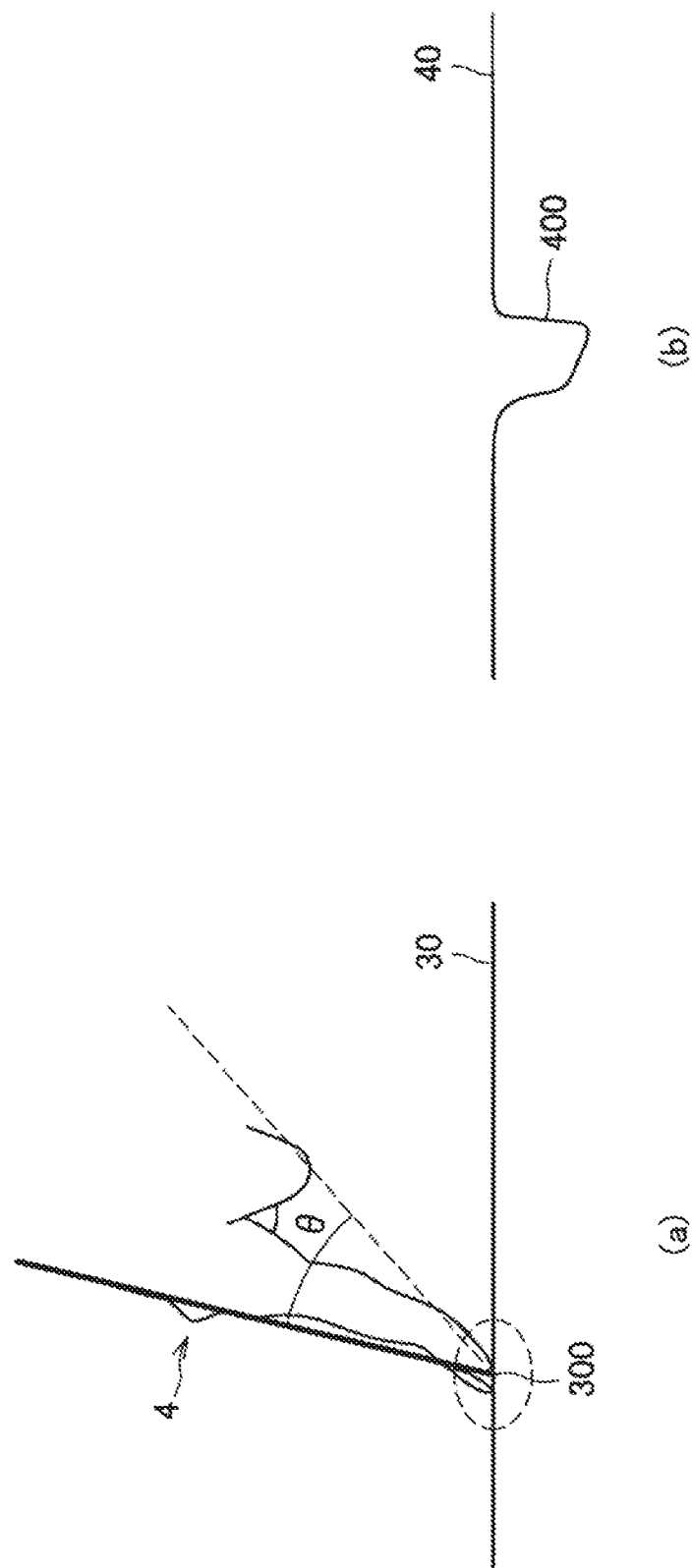

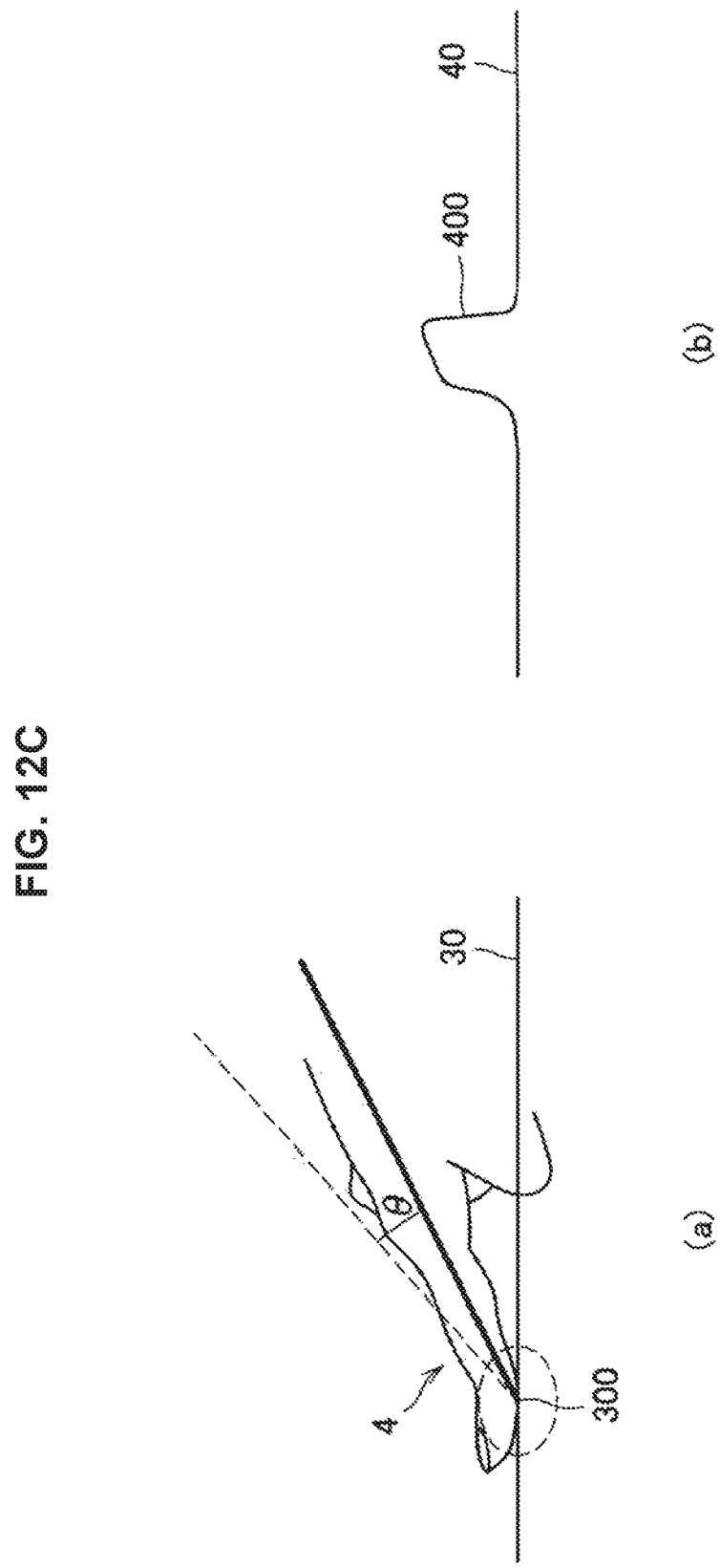

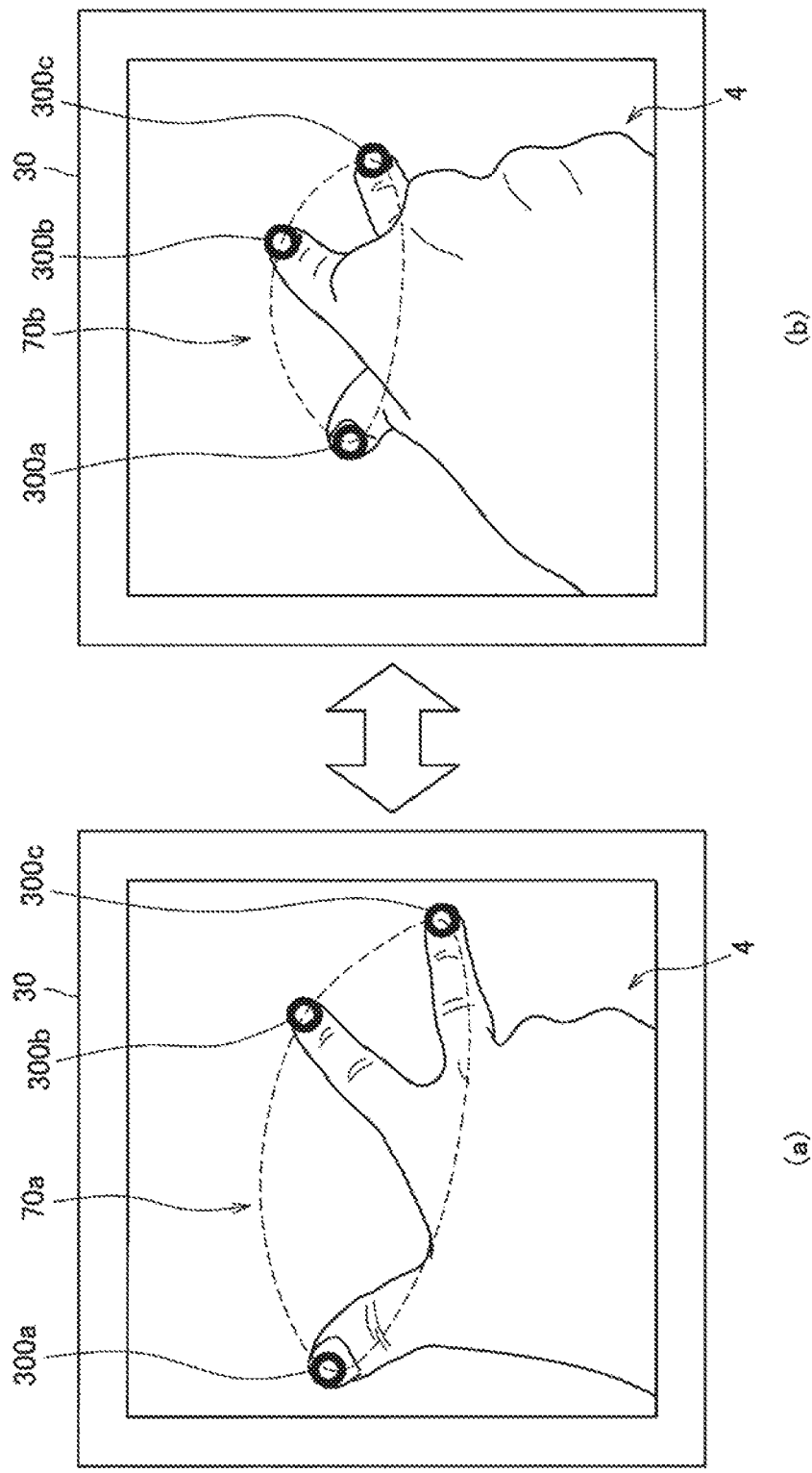

FIG. 23

| θ | OPERATION TYPE | DRAG OPERATION | | | |
|---|---|---|---|---|---|
| | | LESS THAN w1 | EQUAL TO OR GREATER THAN w1 AND LESS THAN w2 | EQUAL TO OR GREATER THAN w2 AND LESS THAN w3 | EQUAL TO OR GREATER THAN w3 |
| EQUAL TO OR GREATER THAN 0° AND LESS THAN 30° | COLOR SELECTION | RED | GREEN | BLUE | BLACK |
| EQUAL TO OR GREATER THAN 30° AND LESS THAN 60° | PEN TYPE SELECTION | PENCIL | BRUSH | FOUNTAIN PEN | AIRBRUSH |
| EQUAL TO OR GREATER THAN 60° AND EQUAL TO OR LESS THAN 90° | PEN WIDTH SELECTION | 4pt | 3pt | 2pt | 1pt |

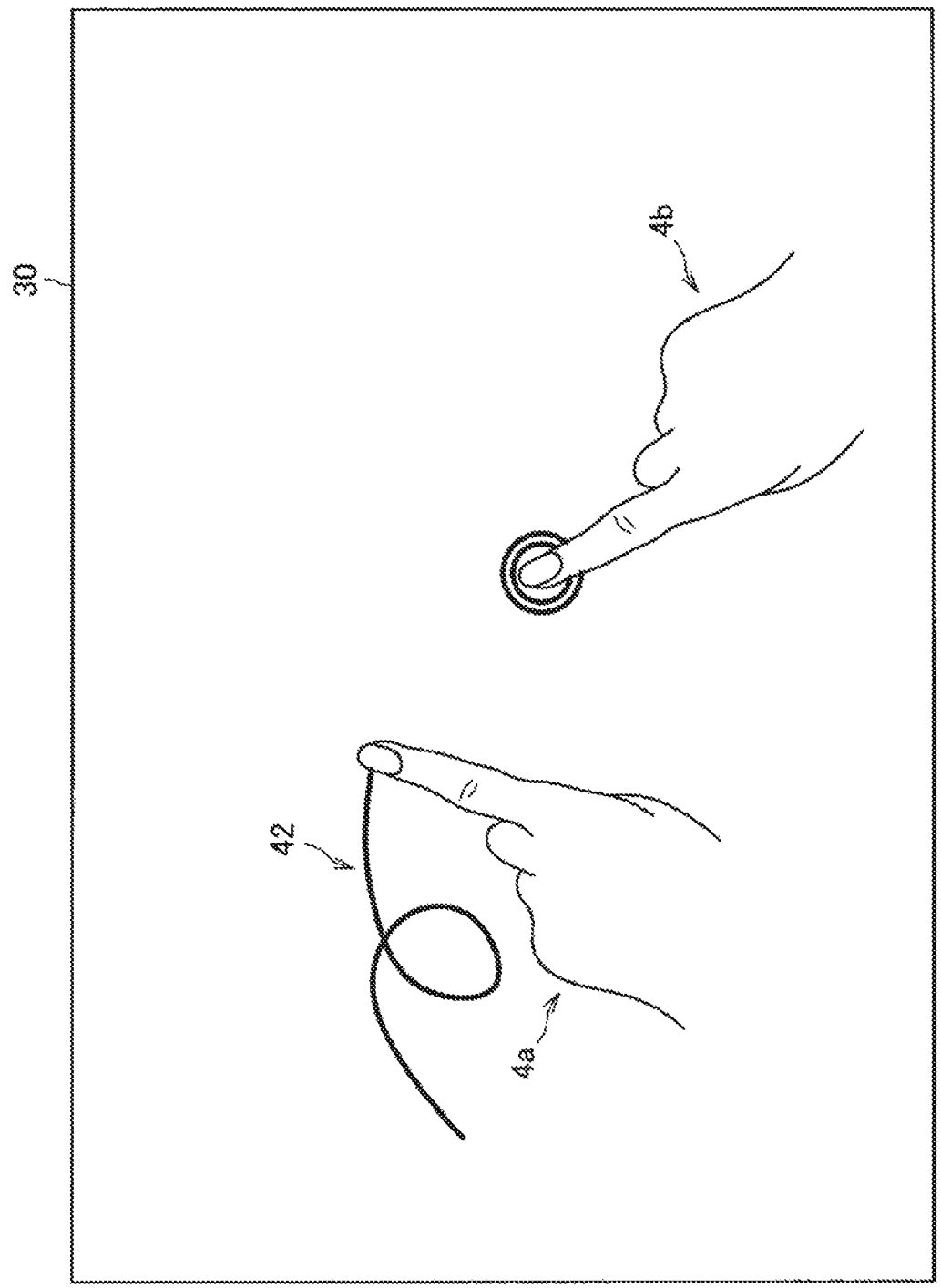

INFORMATION PROCESSING SYSTEM, INFORMATION PROCESSING METHOD, AND PROGRAM

CROSS REFERENCE TO PRIOR APPLICATION

This application is a National Stage Patent Application of PCT International Patent Application No. PCT/JP2017/026095 (filed on Jul. 19, 2017) under 35 U.S.C. § 371, which claims priority to Japanese Patent Application No. 2016-168775 (filed on Aug. 31, 2016), which are all hereby incorporated by reference in their entirety.

TECHNICAL FIELD

The present disclosure relates to an information processing system, an information processing method, and a program.

BACKGROUND ART

In the related art, a touch panel capable of detecting contact or proximity of a finger of a user with a display screen has been developed.

In addition, a technique for intuitively performing an operation on the basis of the detection of the touch on the touch panel has been proposed. For example, Patent Literature 1 describes a technique for moving an image displayed on a display screen according to a movement of a finger in a case in which it is detected that the finger that is in contact with a touch panel is dragged.

CITATION LIST

Patent Literature

Patent Literature 1: JP 2010-55511A

DISCLOSURE OF INVENTION

Technical Problem

However, in the technique described in Patent Literature 1, a process is fixedly executed regardless of an inclination of the finger that is contact with the touch panel.

Therefore, the present disclosure proposes a new and improved information processing system, an information processing method, and a program capable of changing a process to be executed in response to a recognition result of an inclination of a hand with respect to an object.

Solution to Problem

According to the present disclosure, there is provided an information processing system including: an acquisition unit configured to acquire a recognition result of an inclination of a hand with respect to an object when it is recognized that the hand is touching the object; and a change unit configured to change a value of a parameter related to a process to be executed on the basis of the recognition result.

In addition, according to the present disclosure, there is provided an information processing method including: acquiring a recognition result of an inclination of a hand with respect to an object when it is recognized that the hand is touching the object; and changing, by a processor, a value of a parameter related to a process to be executed on the basis of the recognition result.

In addition, according to the present disclosure, there is provided a program that causes a computer to function as: an acquisition unit configured to acquire a recognition result of an inclination of a hand with respect to an object when it is recognized that the hand is touching the object; and a change unit configured to change a value of a parameter related to a process to be executed on the basis of the recognition result.

Advantageous Effects of Invention

As described above, according to the present disclosure, it is possible to change a process to be executed in response to a recognition result of an inclination of a hand with respect to an object. Further, the effects described here are not necessarily limiting, and any effect described in the present disclosure may be included.

BRIEF DESCRIPTION OF DRAWINGS

FIG. 3B is a diagram illustrating an example of an angle of a horizontal direction of the finger with respect to the object when the finger touches the object.

FIG. 11 is a diagram illustrating a projection example of a 3D modeling screen 40 of a sculpt tool according to a second application example of the embodiment.

FIG. 12A is a diagram illustrating an example of a vertical angle of a finger when the finger newly touches the projection surface 30 according to an application example 2 of the embodiment.

FIG. 12B is an explanatory diagram illustrating an example of changing a height of a material 400 in a case in which a relative vertical angle of the finger with respect to the projection surface 30 is a positive angle according to the application example 2 of the embodiment.

FIG. 12C is an explanatory diagram illustrating an example of changing the height of the material 400 in a case in which the relative vertical angle of the finger with respect to the projection surface 30 is a negative angle according to the application example 2 of the embodiment.

FIG. 13 is a diagram illustrating an example in which the vertical angle of three fingers touching the projection surface 30 is changed according to the application example 2.

FIG. 23 is an explanatory diagram illustrating a configuration example of the association table 50 according to an application example 4.

FIG. 24 is an explanatory diagram illustrating a part of an example in which a user changes a type of a line to be drawn according to the application example 4.

MODE(S) FOR CARRYING OUT THE INVENTION

Figure 1:
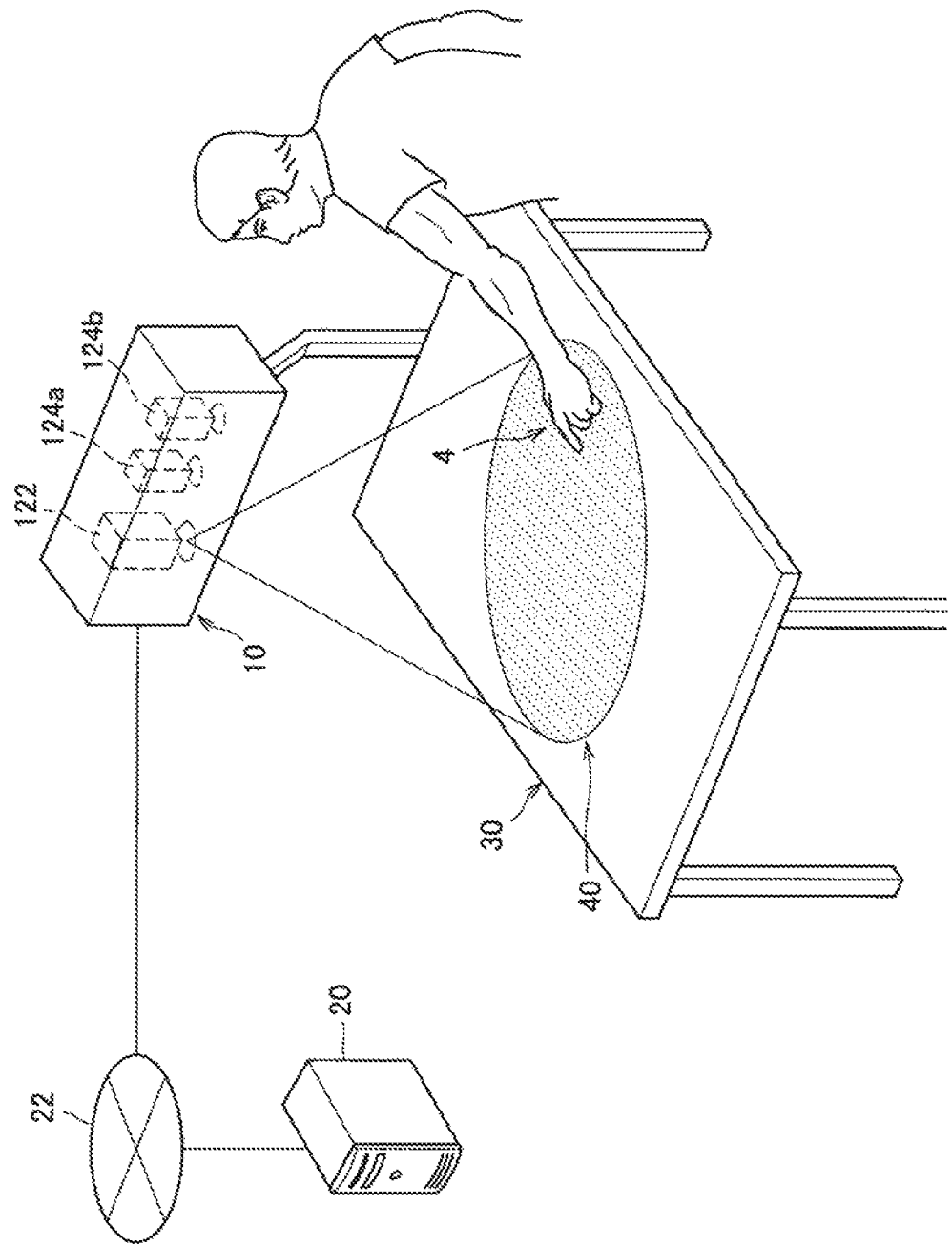
FIG. 1 is an explanatory diagram illustrating a configuration example of an information processing system according to the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Further, in this specification and the drawings, a plurality of constituent elements having substantially the same functional configuration are distinguished by attaching different letters after the same reference numerals. For example, a plurality of configurations having substantially the same functional configuration are distinguished like an information processing device 10a and an information processing device 10b if necessary. Here, in a case in which it is not necessary to particularly distinguish each of a plurality of constituent elements having substantially the same functional configuration, only the same reference numerals are attached. For example, in a case in which it is not necessary to particularly distinguish an information processing device 10a and an information processing device 10b, they are referred to simply as an information processing device 10.

In addition, the "mode(s) for carrying out the invention" will be described according to a sequence of items shown below 1. Configuration of information processing system
2. Detailed description of embodiment
3. Hardware configuration
4. Modified example

1. Configuration of Information Processing System

<1-1. Basic Configuration>

First, a configuration example of the information processing system according to the present embodiment will be described with reference to FIG. 1. As shown in FIG. 1, the information processing system according to the present embodiment includes an information processing device 10, a server 20, and a communication network 22.

{1-1-1. Information Processing Device 10}

The information processing device 10 is an apparatus for executing various processes on the basis of a recognition result of contact or proximity between a surface of an object and a hand of a user.

For example, as shown in FIG. 1, the information processing device 10 may be a projector unit including a display unit 122 and a sensor unit 124. In addition, as shown in FIG. 1, for example, the information processing device 10 is able to be disposed above a projection surface 30 such as a top surface of a table that is present in a real space.

(1-1-1-1. Display Unit 122)

The display unit 122 can be, for example, a projector. For example, the display unit 122 projects content (such as an image) of a display target in a direction of the projection surface 30. Note that the content of the display target may be stored in the information processing device 10 or may be received from a server 20 that will be described later.

(1-1-1-2. Sensor Unit 124)

The sensor unit 124 can include an RGB camera (hereinafter referred to as a camera) 124a, a stereo camera 124b, and the like. Note that the sensor unit 124 may include a depth sensor instead of, or in addition to, the stereo camera 124b. The sensor unit 124 senses information associated with a space in front of the sensor unit 124. For example, the sensor unit 124 photographs an image in front of the sensor unit 124 and senses a distance to an object positioned in front of the sensor unit 124.

For example, as shown in FIG. 1, in a situation in which the user touches the projection surface 30 with his or her hand 4, the camera 124a photographs an image of the projection surface 30 and the hand. At the same time, the stereo camera 124b senses a distance from the stereo camera 124b to the hand or the projection surface 30.

In addition, the information processing device 10 is able to transmit and receive information to and from the server 20. For example, the information processing device 10 transmits an acquisition request of the content of the display target to the server 20 through the communication network 22 that will be described later.

{1-1-2. Server 20}

The server 20 is a device that stores various types of content (an image and the like). In addition, in a case in which the server 20 receives an acquisition request of the content from the information processing device 10, the server 20 transmits the corresponding content to the information processing device 10.

{1-1-3. Communication Network 22}

The communication network 22 is a wired or wireless transmission path of information transmitted from an apparatus connected to the communication network 22. For example, the communication network 22 may include a public line network such as a telephone network, the Internet, or a satellite communication network, or various local area networks (LANs), wide area networks (WANs), and the like including Ethernet (registered trademark). In addition, the communication network 22 may include a dedicated network such as an internet protocol-virtual private network (IP-VPN).

<1-2. Summary of Problem>

The configuration of the information processing system according to the present embodiment has been described above. Incidentally, according to the known technique, in order to recognize a pressure of touch on an object, it is necessary to install a pressure sensor on the object or to use a pressure sensitive touch panel. Therefore, it is impossible to recognize a pressure on a surface of an arbitrary object.

In addition, according to the known technique, for example, it is difficult for a user to instinctively designate a direction of a camera tool, a light tool, or the like in a 3D coordinate system in an application of 3D computer graphics (CG). For example, according to the known technique, in order to designate the direction of the camera tool in a desired direction, it is necessary for the user to designate two points, that is, a point on a base and a point in a direction of a gaze point, and it is difficult to perform an operation. In addition, it is also necessary for the user to rotate a coordinate system or change a scale.

Therefore, the information processing device 10 according to the present embodiment has been created in consideration of the above-described circumstances. The information processing device 10 is able to recognize an inclination of a hand with respect to an object when it is recognized that the hand touches the object and change a value of a parameter associated with a process to be executed on the basis of the recognition result. Therefore, the user can intuitively and easily set the value of the parameter to a desired value by changing the inclination of the hand with respect to the object. Note that, in the present specification and drawings, the description "hand" may mean a finger, a hand, or an arm. In addition, hereinafter, an example in which the information processing device 10 performs a process using the recognition result of the inclination of the finger with respect to the object will be mainly described. However, the present disclosure is not limited to such an example, and the information processing device 10 may use the recognition result of the inclination of the hand or an inclination of the arm with respect to the object.

2. Detailed Description of Embodiment

<2-1. Configuration>

Figure 2:
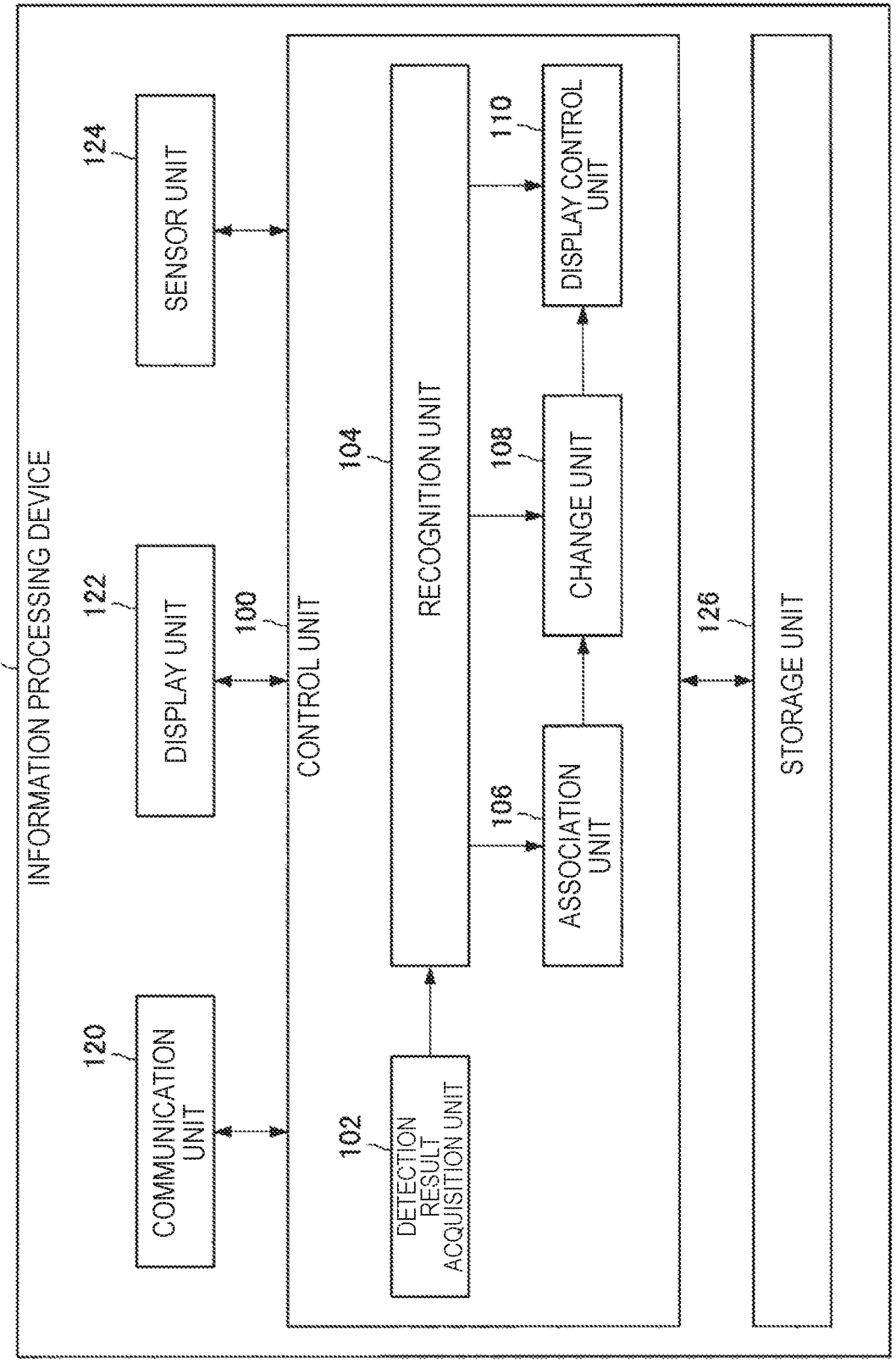
FIG. 2 is a functional block diagram illustrating a configuration example of an information processing device 10 according to the embodiment.

Next, the configuration of the information processing device 10 according to the present embodiment will be described in detail. FIG. 2 is a functional block diagram illustrating the configuration of the information processing device 10 according to the present embodiment. As shown in FIG. 2, the information processing device 10 includes a control unit 100, a communication unit 120, a display unit 122, a sensor unit 124, and a storage unit 126.

{2-1-1. Control Unit 100}

The control unit 100 comprehensively controls operations of the information processing device 10 using hardware such as a central processing unit (CPU) 150 or a random access memory (RAM) 154, which will be described later, built in the information processing device 10. In addition, as shown in FIG. 2, the control unit 100 includes a detection result acquisition unit 102, a recognition unit 104, an association unit 106, a change unit 108, and a display control unit 110.

{2-1-2. Detection Result Acquisition Unit 102}

The detection result acquisition unit 102 acquires a sensing result by the sensor unit 124. For example, the detection result acquisition unit 102 acquires the image photographed by the sensor unit 124 or information associated with the distance to the object positioned in front of the sensor unit 124 detected by the sensor unit 124 as sensor data by performing a process of reception, reading, or the like.

{2-1-3. Recognition Unit 104}

The recognition unit 104 is an example of an acquisition unit in the present disclosure. The recognition unit 104 recognizes a position, a posture, a type, a shape, a movement, and/or the like of the object positioned on the projection surface 30 on the basis of the detection result acquired by the detection result acquisition unit 102. For example, the recognition unit 104 compares the distance information of the projection surface 30 and the object disposed on the projection surface 30 with distance information of the finger of the user to recognize whether or not the finger of the user touches (makes contact with) the projection surface 30 or the object disposed on the projection surface 30. (Note that, in the following description, the projection surface 30 and the object disposed on the projection surface 30 are collectively referred to as "object" in some cases.)

Figure 3A:
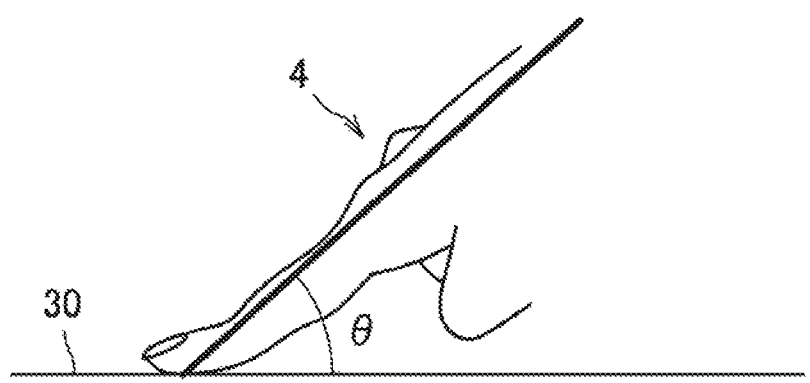
FIG. 3A is a diagram illustrating an example of an angle of a vertical direction of a finger with respect to an object when the finger touches the object.

In addition, in a case in which it is recognized that the finger touches the object, the recognition unit 104 further recognizes an inclination of a vertical direction and a horizontal direction of the finger with respect to the object. For example, as shown in FIG. 3A, the recognition unit 104 recognizes an angle θ of the vertical direction of the finger with respect to the object when the finger touches the object. The angle θ may be an angle in a case in which the finger is moved in the vertical direction with the pad of the finger touching the object as an action point. Note that FIG. 3A shows an example in which the angle θ is an absolute angle. However, the present disclosure is not limited to such an example, and the recognition unit 104 may recognize a current relative angle by using the angle of the vertical direction with respect to the object at an initial touch on the object as a reference. Note that details of the relative angle will be described later with reference to FIGS. 12A to 12C.

In addition, as shown in FIG. 3B, the recognition unit 104 recognizes an angle φ of the horizontal direction of the finger with respect to the object when the finger touches the object.

{2-1-4. Association Unit 106}
(2-1-4-1. Association Example 1)

The association unit 106 associates the inclination of the finger recognized as the finger touching the object with a parameter related to a process executed by the information processing device 10 on the basis of a predetermined condition. For example, the association unit 106 associates the angle of the vertical direction of the finger with respect to the object and the parameter related to the process to be executed for each active application. In addition, the association unit 106 associates the angle of the vertical direction of the finger with respect to the object and the parameter related to the process to be executed according to an object corresponding to the touch position of the finger among one or more objects projected on the object by the display unit 122. In addition, the association unit 106 associates the angle of the vertical direction of the finger with respect to the object and the parameter related to the process to be executed for each object.

Figure 4:
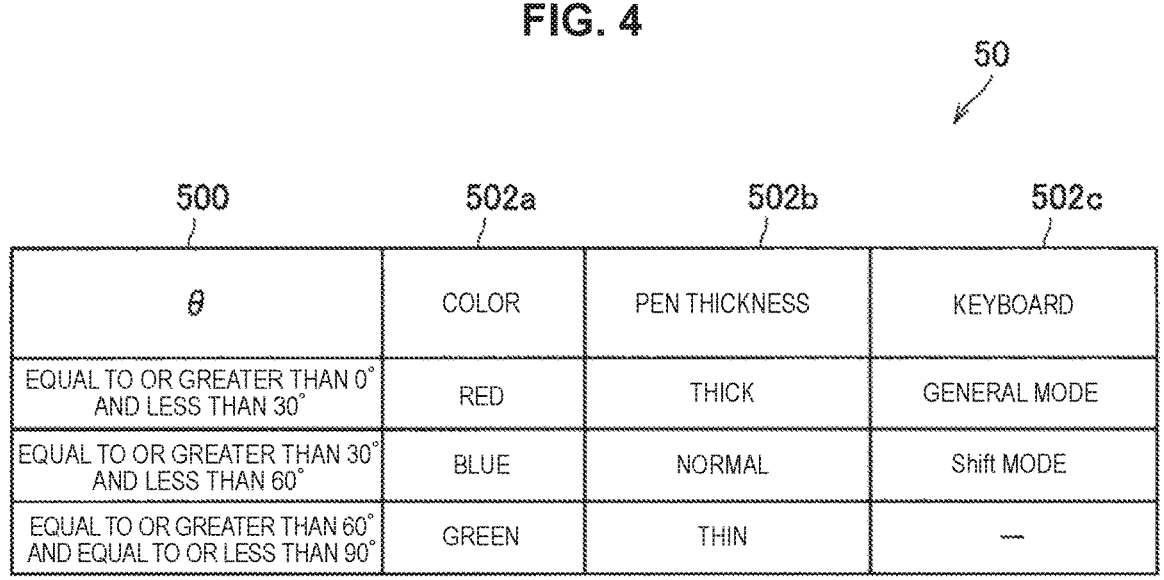
FIG. 4 is an explanatory diagram illustrating a configuration example of an association table 50 according to the embodiment.

As an example, the association unit 106 associates the angle of the vertical direction of the finger with respect to the object with the parameter related to the process to be executed, on the basis of an association table 50 as shown in FIG. 4. For example, in a case in which a paint application is being activated, the association unit 106 may associate an angle 500 of the vertical direction of the finger with respect to the object with a color 502*a* of a pen used for drawing or may associate the angle 500 of the vertical direction of the finger with respect to the object with a thickness 502*b* of the pen used for drawing. In addition, in a case in which a software keyboard is being activated, the association unit 106 may associate the angle 500 of the vertical direction of the finger with respect to the object with a mode 502*c* (a general mode or a shift mode) changed in a case in which any key included in the software keyboard is pressed with the finger. According to this association example, it is possible for the user to perform general-purpose, seamless mode change.

(2-1-4-2. Association Example 2)

In addition, the association unit 106 is able to associate the angle of the vertical direction of the hand with respect to the object with a first parameter and associate the angle of the horizontal direction of the hand with respect to the object with a second parameter. Note that the second parameter is a parameter of which a type is different from that of the first parameter. In addition, when it is recognized that two or more fingers are touching one or more objects, the association unit 106 is able to associate the angle of the vertical direction of a first finger with respect to the object with the first parameter and associate the angle of the vertical direction of a second finger with respect to the object with the second parameter. For example, in a case in which the paint application is being activated, the association unit 106 may associate the angle of the vertical direction of the first finger with respect to the object with the color of the pen used for drawing and associate the angle of the vertical direction of the second finger with respect to the object with the thickness of the pen used for drawing.

{2-1-5. Change Unit 108}
(2-1-5-1. Change Example 1)

The change unit 108 changes a value of a parameter related to a process to be executed on the basis of a recognition result by the recognition unit 104 and a result of the association by the association unit 106. For example, the change unit 108 changes a value of a parameter associated with the finger on the basis of the recognition result of the angle of the vertical direction of the finger. Alternatively, the change unit 108 changes a value of a parameter associated with the object touched by the finger on the basis of the recognition result of the angle of the vertical direction of the finger. Alternatively, the change unit 108 changes a value of a parameter associated with an object corresponding to a touch position of the finger on the object among one or more objects projected on the object on the basis of the recognition result of the angle of the vertical direction of the finger.

Figure 5A:
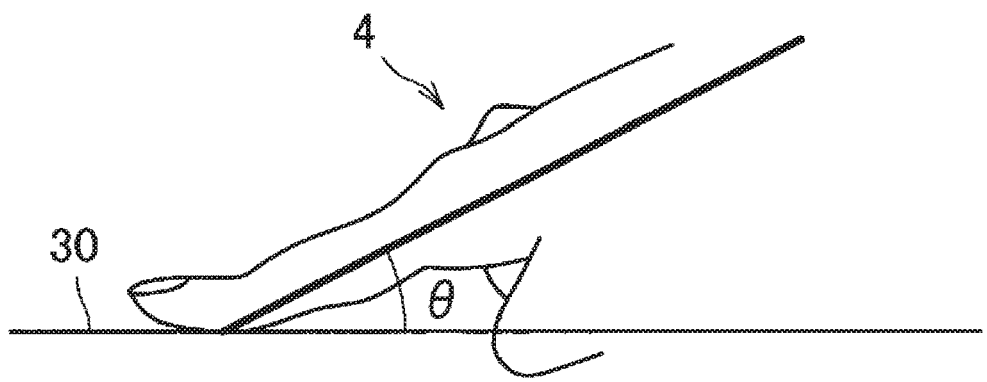
FIG. 5A is a diagram illustrating an example of a case in which the angle of the vertical direction of the finger with respect to the object recognized as the object touched by the finger is "equal to or greater than 0° and less than 30°".
Figure 5B:
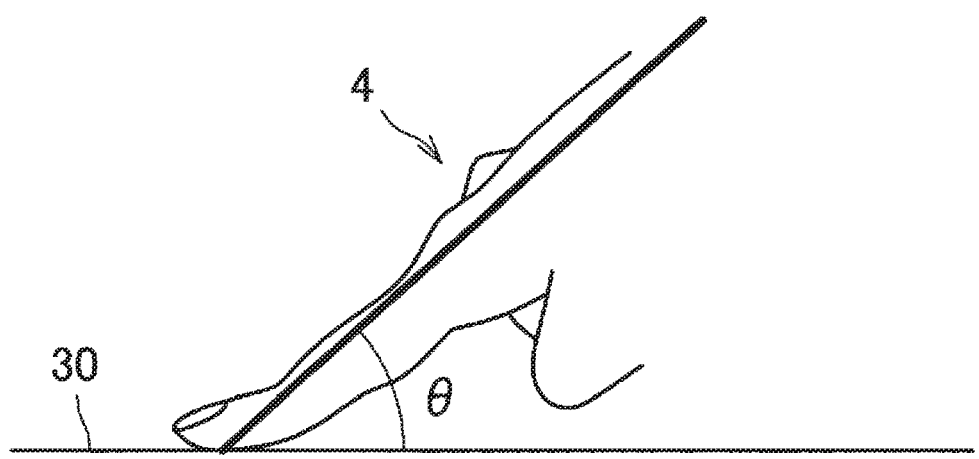
FIG. 5B is a diagram illustrating an example of a case in which the angle of the vertical direction of the finger with respect to the object recognized as the object touched by the finger is "equal to or greater than 30° and less than 60°".
Figure 5C:
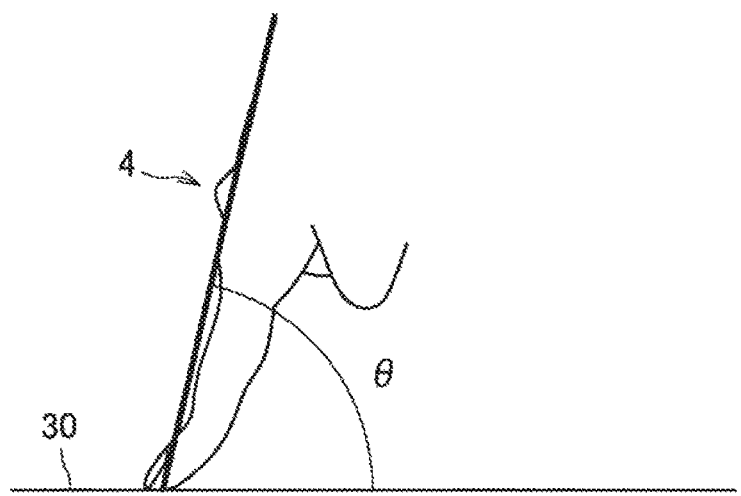
FIG. 5C is a diagram illustrating an example of a case in which the angle of the vertical direction of the finger with respect to the object recognized as the object touched by the finger is "equal to or greater than 60° and equal to or less than 90°".

For example, in the example of the association table 50 shown in FIG. 4, the change unit 108 changes the value of the parameter according to whether the angle of the vertical direction of the finger with respect to the object recognized as the object touched by the finger is "equal to or greater than 0° and less than 30°" (as shown in FIG. 5A), is "equal to or greater than 30° or and less than 60°" (as shown in FIG. 5B), or is "equal to or greater than 60° and less than 90°" (as shown in FIG. 5C).

Note that the present disclosure is not limited to the example in which the value of the parameter is changed in 30° intervals, and the change unit 108 is able to change the value of the parameter in arbitrary angle intervals. In addition, the present disclosure is not limited to the example in which the value of the parameter is discretely changed, and the change unit 108 may continuously change the value of the parameter related to the process to be executed on the basis of the angle of the vertical direction of the finger with respect to the object and a predetermined function (as an analog amount).

(2-1-5-2. Change Example 2)

In addition, the change unit 108 is able to change the value of the first parameter associated with the angle of the vertical direction of the finger on the basis of the recognition result of the angle of the vertical direction of the finger and change the value of the second parameter associated with the angle of the horizontal direction of the finger on the basis of the recognition result of the angle of the horizontal direction of the finger. In addition, when it is recognized that two or more fingers are touching one or more objects, the association unit 106 is able to change the value of the parameter associated with the first finger on the basis of the recognition result of the angle of the first finger recognized as the finger touching the object and change the value of the parameter associated with the second finger on the basis of the recognition result of the angle of the second finger recognized as the finger touching the object. In addition, the change unit 108 is also able to change the value of the parameter associated with the object or the hand at a rate of change according to the number of fingers recognized as the fingers touching the object.

In addition, the change unit 108 may further change the value of the parameter associated with the object or the hand at a rate of change according to the thickness of the finger recognized as the finger touching the object. For example, although the angle of the finger with respect to the object is the same, the value of the corresponding parameter may be more largely changed as the thickness of the finger touching the object is larger. In addition, the change unit 108 may further change the value of the parameter associated with the object or the hand at a rate of change according to the number of users recognized as users touching the object.

For example, the change unit 108 may more largely change the value of the corresponding parameter as the number of users touching the object increases.

{2-1-6. Display Control Unit 110}

The display control unit 110 controls display on the display unit 122. For example, the display control unit 110 causes the display unit 122 to display the contents (the image and the like) of the display target.

In addition, the display control unit 110 causes the display unit 122 to display information indicating the recognition result of the touch of the finger on the object, for example, at a display position associated with the finger. For example, while it is recognized that the finger touches the object, the display control unit 110 causes the display unit 122 to display a predetermined image at a position of the finger or in the vicinity of the finger. In addition, when it is recognized that the finger is separated from the object, the display control unit 110 causes the display unit 122 not to display the predetermined image.

Figure 6:
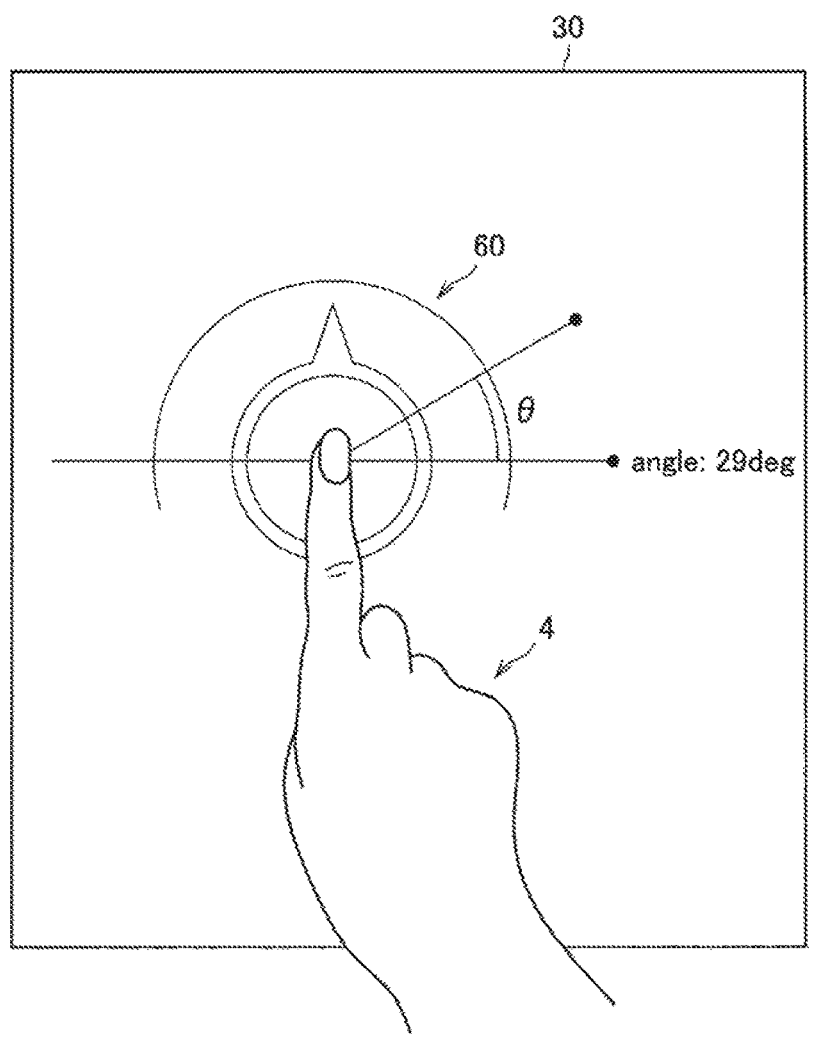
FIG. 6 is a diagram illustrating a display example of a GUI showing the angle of the vertical direction of the finger with respect to the object.

Note that, in an application in which a feedback indicating the angle of the finger with respect to the projection surface 30 is not displayed, it is difficult for the user to distinguish, for example, a difference between the angle of the vertical direction of a current finger and an angle of a vertical direction of an immediate previous finger with respect to the object, recognized by the recognition unit 104. As a result, it is considered that it is difficult for the user to set the value of the corresponding parameter to a desired value. Therefore, as shown in FIG. 6, the display control unit 110 may cause the display unit 122 to display a GUI showing the angle of the vertical direction of the finger with respect to the object at the touch position of the finger or in the vicinity of the touch position of the finger. Note that the GUI 60 shown in FIG. 6 is a display example showing the current angle θ of the current vertical direction of the finger with respect to the projection surface 30. Here, the angle θ may be an absolute angle as described above, or may be a relative angle using the angle of the vertical direction with respect to the projection surface 30 as a reference at the initial touch on the projection surface 30.

{2-1-7. Communication Unit 120}

The communication unit 120 transmits and receives information to and from other devices. For example, the communication unit 120 transmits an acquisition request of the content of the display target to the server 20 in accordance with the control of the display control unit 110. In addition, the communication unit 120 receives the content from the server 20.

{2-1-8. Display Unit 122}

The display unit 122 displays an image in accordance with the control of the display control unit 110. For example, the display unit 122 projects the image in a forward direction of the display unit 122 in accordance with the control of the display control unit 110.

{2-1-9. Storage Unit 126}

The storage unit 126 stores various data and various kinds of software. For example, the storage unit 126 temporarily stores information indicating the content of the association by the association unit 106.

<2-2. Application Example>

The configuration according to the present embodiment has been described above. Next, an application example of the present embodiment will be described in "2-2-1. Application example 1" to "2-2-4. Application example 4".

{2-2-1. Application Example 1}

Figure 7:
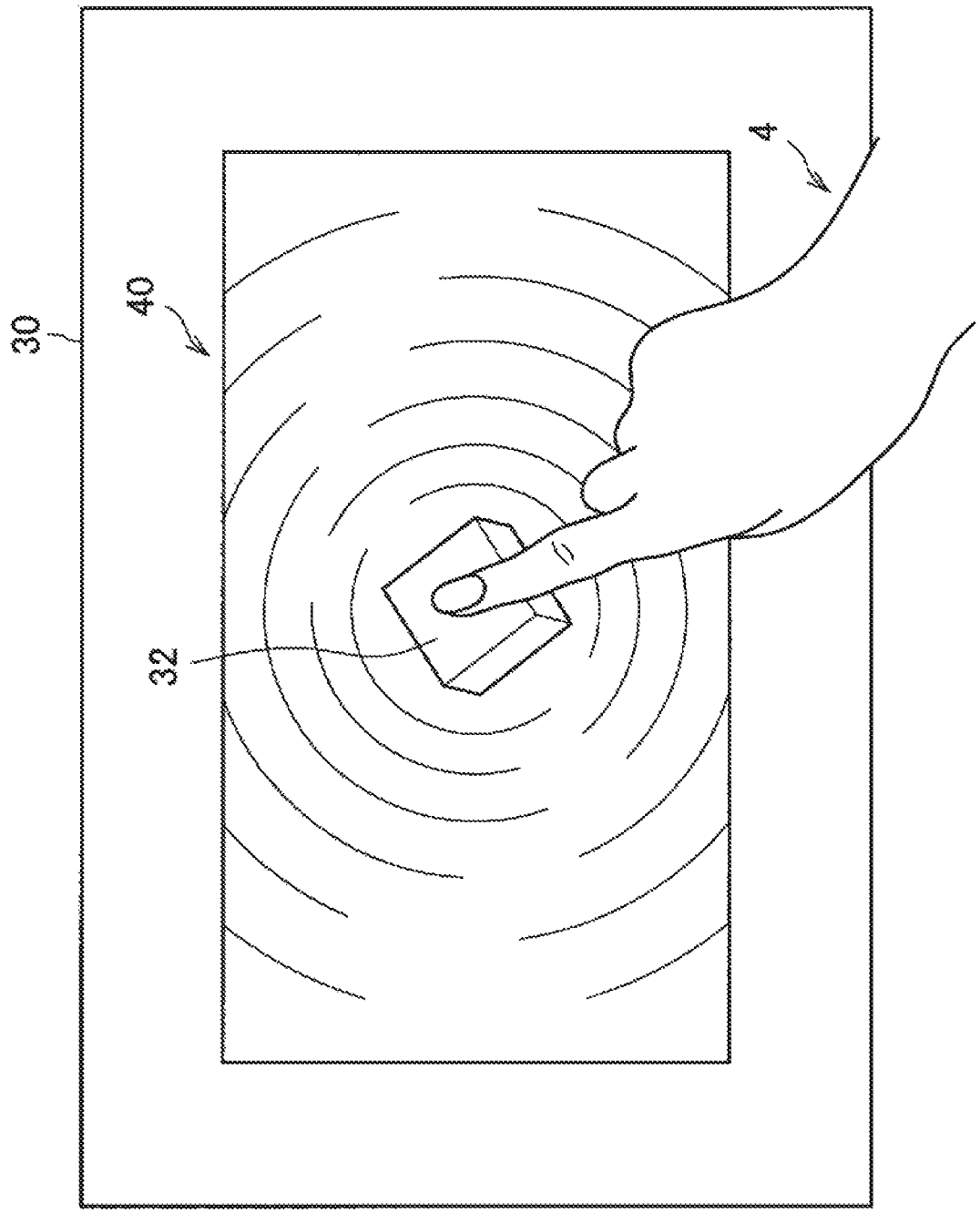
FIG. 7 is a diagram illustrating an example in which an image 40 of a water surface is projected on a projection surface 30 according to an application example 1 of the embodiment.

First, the application example 1 will be described. In the application example 1, for example, as shown in FIG. 7, an image 40 of a water surface is projected on the projection surface 30. In addition, a block 32 is disposed by the user within a range where the image 40 of the water surface is projected on the projection surface 30. In addition, the image 40 of the water surface that is being projected is interactively changed according to the angle of the vertical direction of the hand with respect to the block 32.

(2-2-1-1. Change Unit 108)

Figure 8:
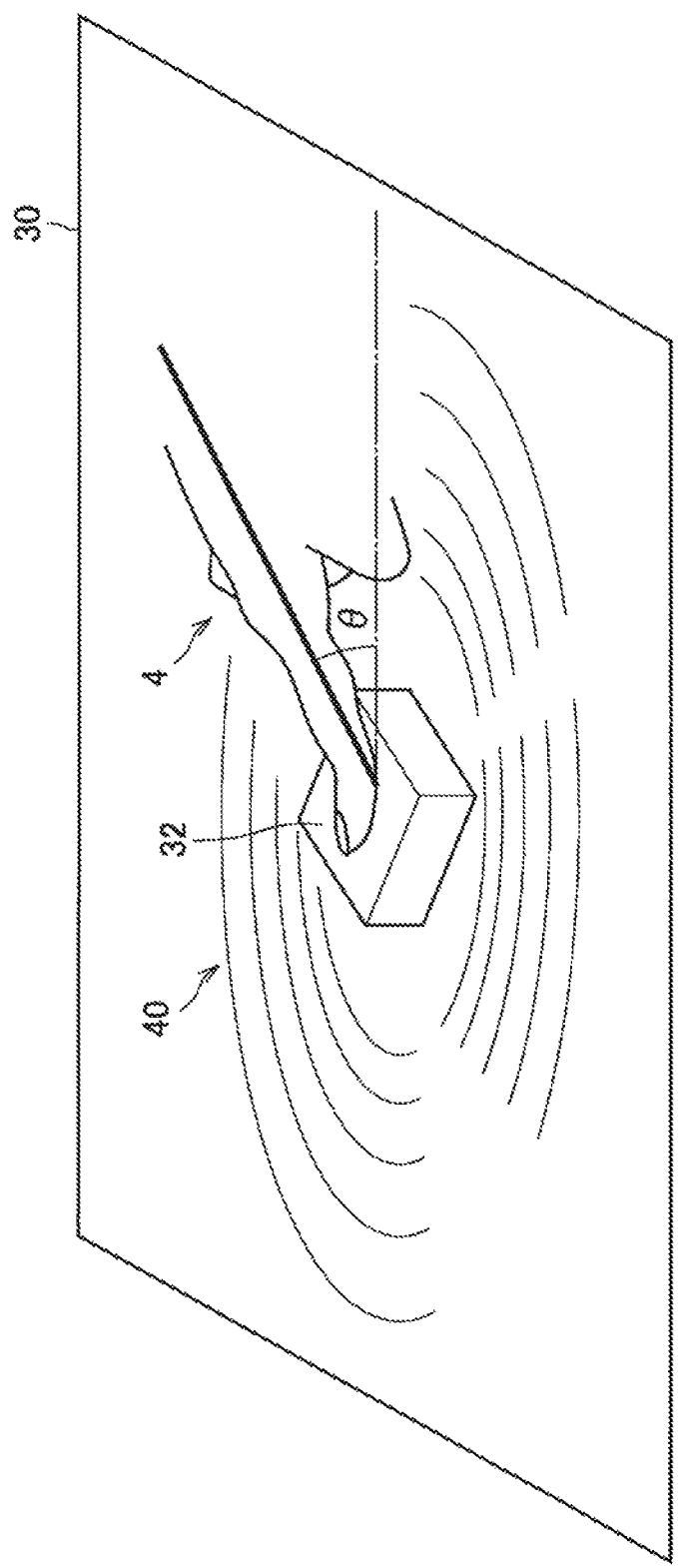
FIG. 8 is a diagram illustrating a projection example of the image 40 of the water surface in a case in which the vertical angle of the finger with respect to a block 32 is small according to the application example 1.

In a case in which the recognition unit 104 recognizes that the finger touches the block 32, the change unit 108 according to the application example 1 changes a value of a parameter related to the image of the water surface that is being projected in accordance with a vertical angle of the finger with respect to the block 32. For example, as shown in FIG. 8, in a case in which it is recognized that the finger touches the block 32 and the vertical angle θ of the finger with respect to the block 32 is small, the change unit 108 changes the value of the parameter related to the image of the water surface so that a small ripple is displayed from a center position of the block 32 in the displayed image 40 of the water surface.

Figure 9:
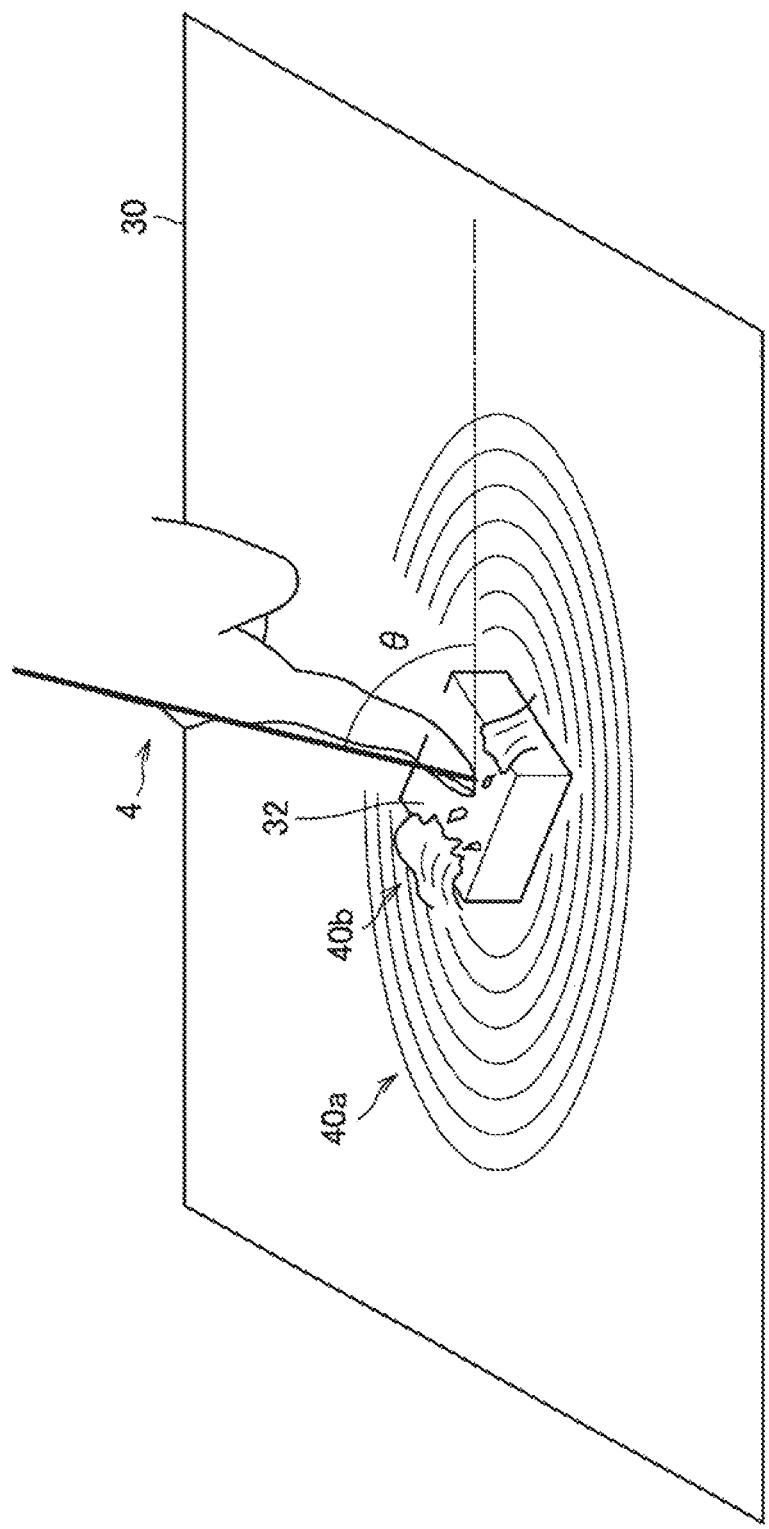
FIG. 9 is a diagram illustrating the projection example of the image 40 of the water surface in a case in which the vertical angle of the finger with respect to the block 32 is large according to the application example 1.

In addition, in a case in which the vertical angle θ of the finger with respect to the block 32 is large, as shown in FIG. 9, the change unit 108 changes the value of the parameter related to the image of the water surface so that a large ripple is displayed from the center position of the block 32 in the displayed image 40 of the water surface. In addition, as shown in FIG. 9, the change unit 108 further changes the value of the parameter related to the image of the water surface so that an animation 40b of a water splash is displayed on the block 32. According to the present modified example, as the vertical angle of the finger with respect to the block 32 is increased, it is possible to produce an expression as if the block 32 is more strongly pressed by the finger (a pressure becomes stronger) and the block 32 is pushed into water.

(2-2-1-2. Flow of Process)

Figure 10:
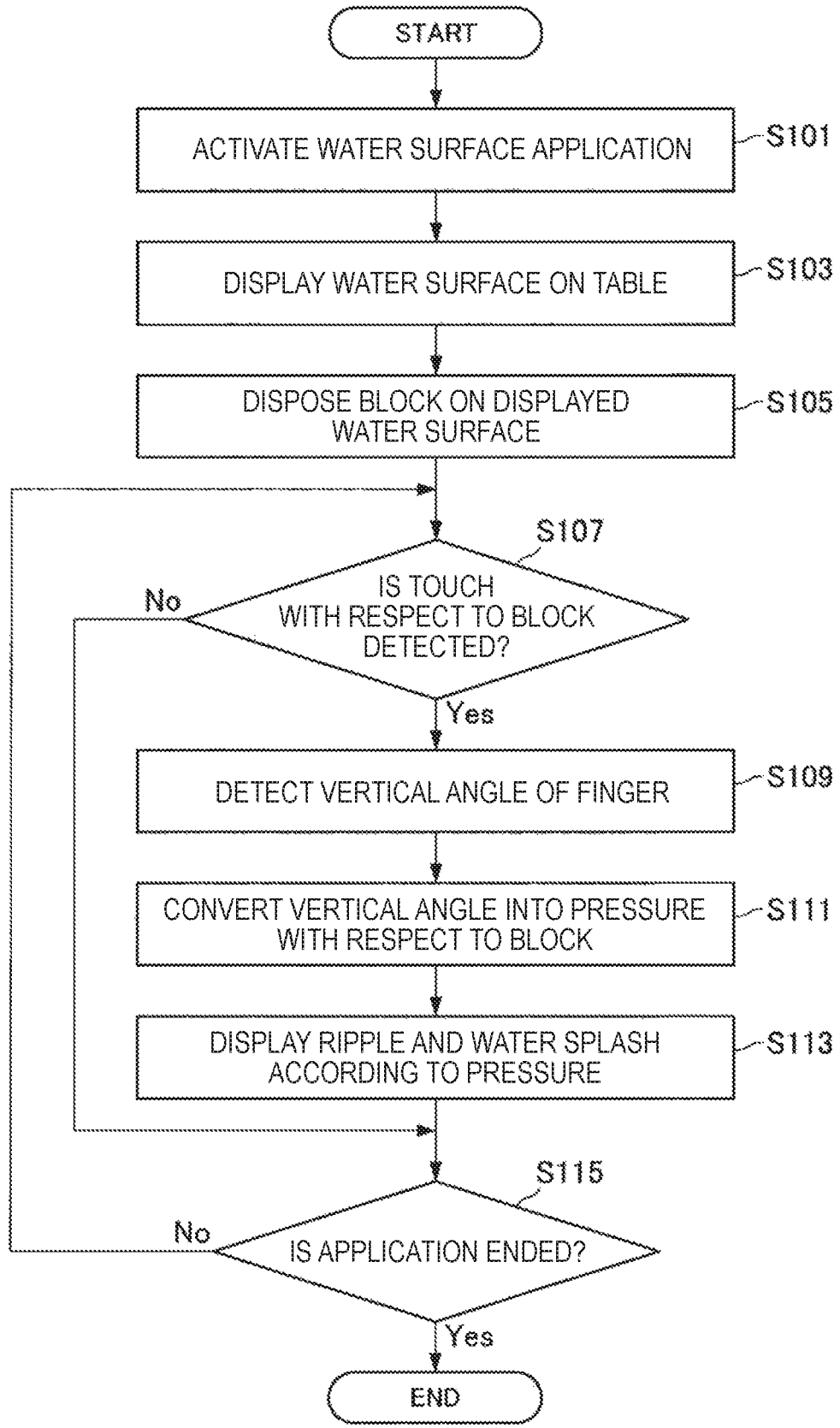
FIG. 10 is a flowchart illustrating a flow of a process according to the application example 1.

Here, the flow of the process according to the application example 1 will be described with reference to FIG. 10. As shown in FIG. 10, first, for example, the user selects a water surface application from among a plurality of applications stored in the storage unit 126, and activates the water surface application (S101). Thereafter, the display control unit 110 causes the display unit 122 to project the image of the water surface on the projection surface 30 on the basis of the activated water surface application (S103).

Thereafter, the user disposes the block 32 within a range corresponding to the image of the water surface projected in S103 on the projection surface 30 (S105).

Thereafter, the recognition unit 104 determines whether or not it is recognized that the finger touches the block 32 on the basis of the detection result by the sensor unit 124 (S107). In a case in which it is recognized that the finger does not touch the block 32 (S107: No), the control unit 100 performs a process of S115 that will be described later.

On the other hand, in a case in which it is recognized that the finger touches the block 32 (S107: Yes), the recognition unit 104 further recognizes the vertical angle of the finger with respect to the block 32 on the basis of the detection result (S109).

Next, the change unit 108 converts a value of the vertical angle recognized in S109 by using a predetermined function to calculate a value of a virtual pressure of the finger with respect to the block 32 (S111).

Next, the change unit 108 changes the value of the parameter related to the image of the water surface so that the ripple of the size according to the value of the pressure calculated in S111 is displayed from the center position of the block 32. In addition, in a case in which the value of the pressure is larger than a predetermined threshold value, the change unit 108 changes the value of the parameter related to the image of the water surface so that the animation of the water splash is further displayed on the block 32.

In addition, the display control unit 110 causes the display unit 122 to project the image of the water surface on the projection surface 30 (and the block 32) in accordance with the value of the parameter after the change (S113).

Thereafter, in a case in which the user performs an operation of ending the water surface application (S115: Yes), the process is ended. On the other hand, in a case in which the user does not perform the operation of ending the water surface application (S115: No), the control unit 100 performs the process of S107 and the subsequent processes again.

{2-2-2. Application Example 2}

Next, the application example 2 will be described. In the application example 2, for example, as shown in FIG. 11, a 3D modeling screen 40 of a sculpt tool is projected on the projection surface 30. This sculpt tool is an application for sculpting mainly materials such as clay. In addition, in the sculpt tool, for example, the user is able to intuitively perform sculpting by sliding the finger while changing the vertical angle of the finger on the projected 3D modeling screen 40. For example, compared to related art, there is an advantage that it is not necessary to input a pen to a pressure-sensitive panel or to use a dedicated expensive pen tool.

(2-2-2-1. Change Unit 108)

The change unit 108 according to the application example 2 changes a height of a material 400 corresponding to a touch position 300 of the finger on the projection surface 30 on the basis of the recognition result of a relative vertical angle of the finger with respect to the projection surface 30 using with reference to the vertical angle of the finger when the finger newly touches the projection surface 30 as shown in FIG. 12A. For example, the change unit 108 successively changes the height of the material 400 corresponding to the touch position 300 on the basis of the touch position 300 of the finger moved while touching the projection surface 30 and the recognition result of the relative vertical angle of the finger in the touch position 300.

More specifically, as shown in (a) of FIG. 12B, in a case in which the relative vertical angle θ of the finger is a positive angle, as shown in (b) of FIG. 12B, the change unit 108 digs the material 400 corresponding to the touch position 300 of the finger on the basis of the relative vertical angle θ of the finger. In addition, as shown in (a) of FIG. 12C, in a case in which the relative vertical angle θ of the finger is a negative angle, as shown in (b) of FIG. 12C, the change unit 108 raises the material 400 corresponding to the touch position 300 of the finger on the basis of the relative vertical angle θ of the finger. Therefore, as shown in FIG. 11, the user can intuitively sculpt the material by sliding the finger on the projection surface 30 while changing the vertical angle of the finger with respect to the projection surface 30.

Modified Example

Figure 14:
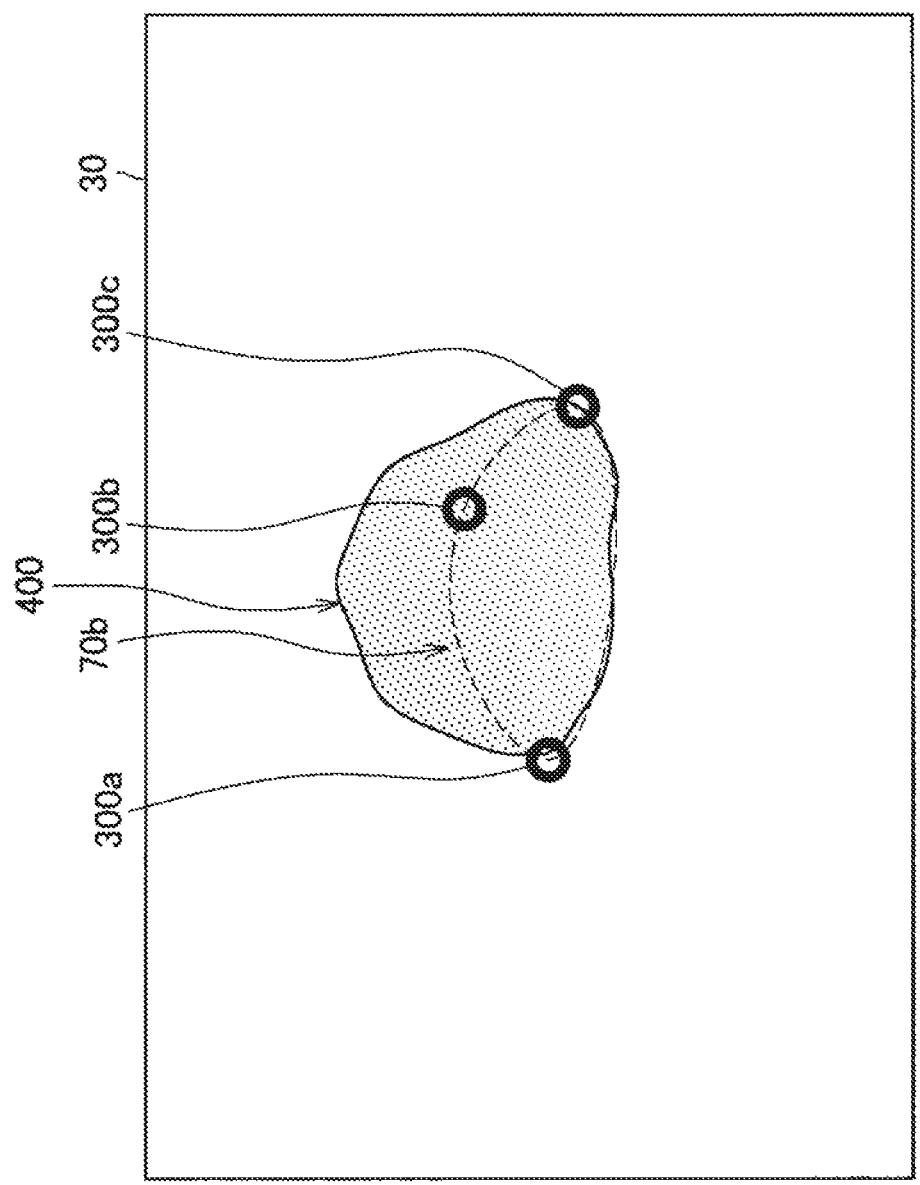
FIG. 14 is an explanatory diagram illustrating an example of changing the height of the material 400 corresponding to a surface 70 surrounded by the three fingers after the change of the vertical angle of the three fingers shown in FIG. 13.

Note that, as the modified example, as shown in FIG. 13, in a case in which it is recognized that a plurality of fingers touch the projection surface 30, the change unit 108 is also able to change the height of the material corresponding to the region surrounded by the plurality of fingers on the basis of the recognition result of the change in the vertical angle of the plurality of fingers. For example, in a case in which it is recognized that three or more fingers touch the projection surface 30, and as shown in FIG. 13(a) and FIG. 13(b), a relative vertical angle of the three or more fingers is increased, as shown in FIG. 14, the change unit 108 may change the height of the material 400 corresponding to a surface 70 surrounded by the three or more fingers after the change so that the height is higher. In addition, in a case in which it is recognized that two fingers touch the projection surface 30 and a relative vertical angle of the two fingers is increased, the change unit 108 may change the height of the material 400 corresponding to a line segment connected by a touch position of the two fingers after the change so that the height is higher.

In addition, as another modified example, the change unit 108 is also able to change a type of the process to be executed on the basis of the number of fingers recognized as fingers touching the projection surface 30. For example, in a case in which it is recognized that only one finger touches the projection surface 30, the change unit 108 may perform a sculpting process (that is, change of the height of the material 400) on the basis of the recognition result of the (relative) angle of the vertical direction of the one finger. In addition, in a case in which it is recognized that two fingers of the same hand simultaneously touch the projection surface 30 and the two fingers are inclined in the vertical direction, the change unit 108 may perform a zoom process of an image or the like projected on the projection surface 30 with a display magnification according to the recognition result of the (for example, relative) angle of the vertical direction of the two fingers.

(2-2-2-2. Flow of Process)

Figure 15:
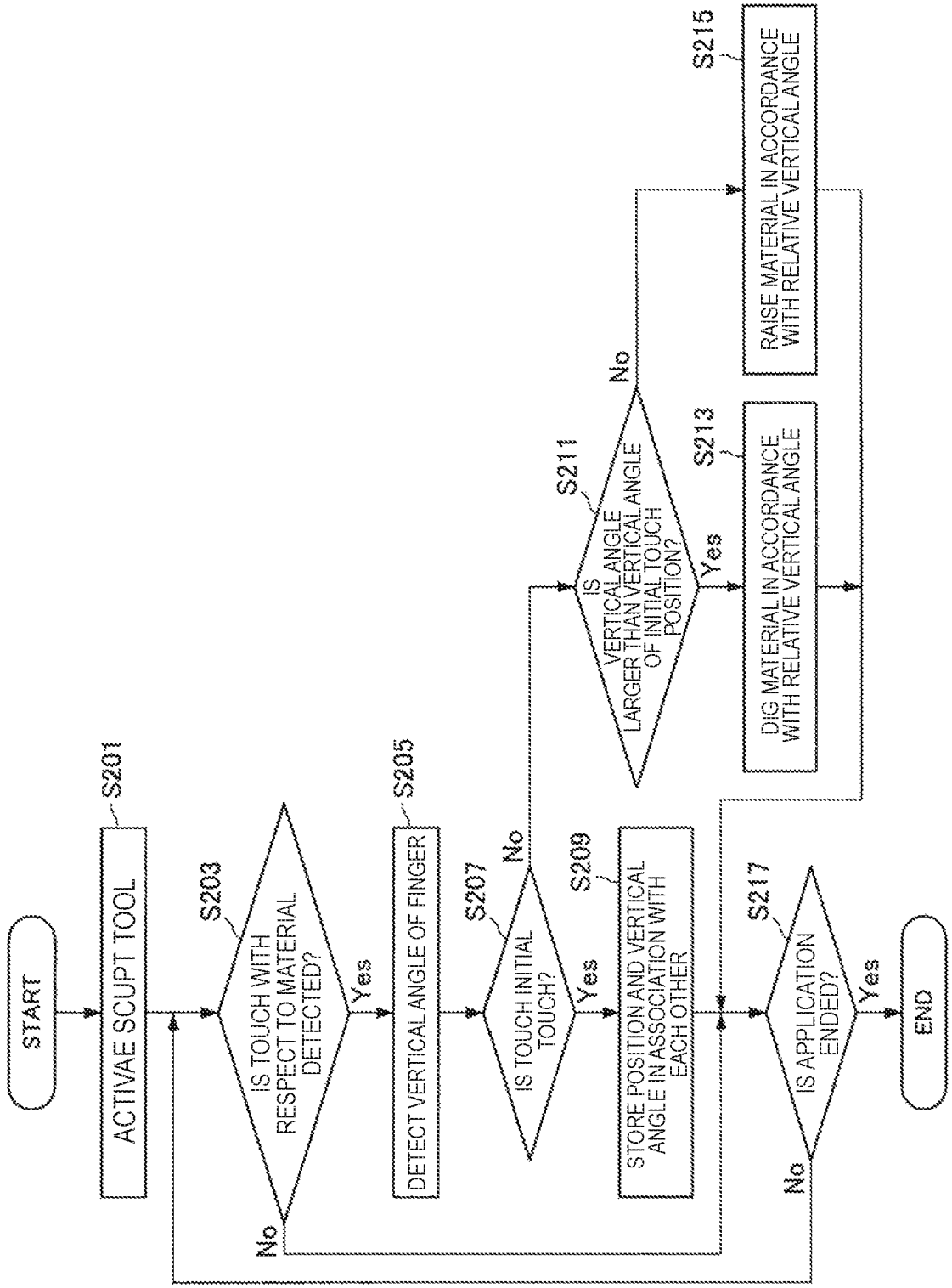
FIG. 15 is a flowchart illustrating a flow of a process according to the application example 2.

Here, the flow of the process according to the application example 2 will be described with reference to FIG. 15. As shown in FIG. 15, first, for example, the user selects a sculpt tool from among the plurality of applications stored in the storage unit 126, and activates the sculpt tool (S201). Therefore, the display unit 122 projects the 3D modeling screen 40 on the projection surface 30 in accordance with the control of the display control unit 110.

Thereafter, the recognition unit 104 recognizes whether or not the finger touches the material 400 (included in the 3D modeling screen 40) projected on the projection surface 30 on the basis of the detection result by the sensor unit 124 (S203). In a case in which it is recognized that the finger does not touch the projected material 400 (S203: No), the control unit 100 performs a process of S217 that will be described later.

On the other hand, in a case in which it is recognized that the finger touches projected material 400 (S203: Yes), the recognition unit 104 further recognizes the (absolute) vertical angle of the finger with respect to the projection surface 30 on the basis of the detection result (S205).

In addition, the control unit 100 determines whether or not a currently recognized touch is an initial touch (that is, whether or not the finger has been separated from the projection surface 30 until just before) (S207). In a case in which the currently recognized touch is the initial touch (S207: Yes), the control unit 100 stores the position of the touch recognized in S205 and the vertical angle recognized in S205 in the storage unit 126 in association with each other (S209), in addition, the control unit 100 performs a process of S217 that will be described later.

On the other hand, in a case in which the currently recognized touch is not the initial touch (S207: No), the change unit 108 determines whether or not the vertical angle recognized in S205 is larger than the vertical angle at an initial touch stored in S209 (S211). In a case in which the vertical angle recognized in S205 is larger than the vertical angle at the initial touch (S211: Yes), the change unit 108 digs the material corresponding to the touch position recognized in S203 in accordance with the relative value of the vertical angle recognized in S205 with reference to the vertical angle stored in S209. In addition, the display control unit 110 causes the display unit 122 to project the 3D modeling screen 40 according to the changed material on the projection surface 30 (S213). Thereafter, the control unit 100 performs the process of S217 that will be described later.

On the other hand, in a case in which the vertical angle recognized in S205 is equal to or less than the vertical angle at the initial touch (S211: No), the change unit 108 raises the material corresponding to the touch position recognized in S203 in accordance with the relative value of the vertical angle recognized in S205 with reference to the vertical angle stored in S209. In addition, the display control unit 110 causes the display unit 122 to project the 3D modeling screen 40 according to the changed material on the projection surface 30 (S215).

Thereafter, in a case in which the user performs an operation of ending the sculpt tool (S217: Yes), the process is ended. On the other hand, in a case in which the user does not perform the operation of ending the sculpt tool (S217: No), the control unit 100 performs the process of S203 and the subsequent processes again.

{2-2-3. Application Example 3}

Figure 16:
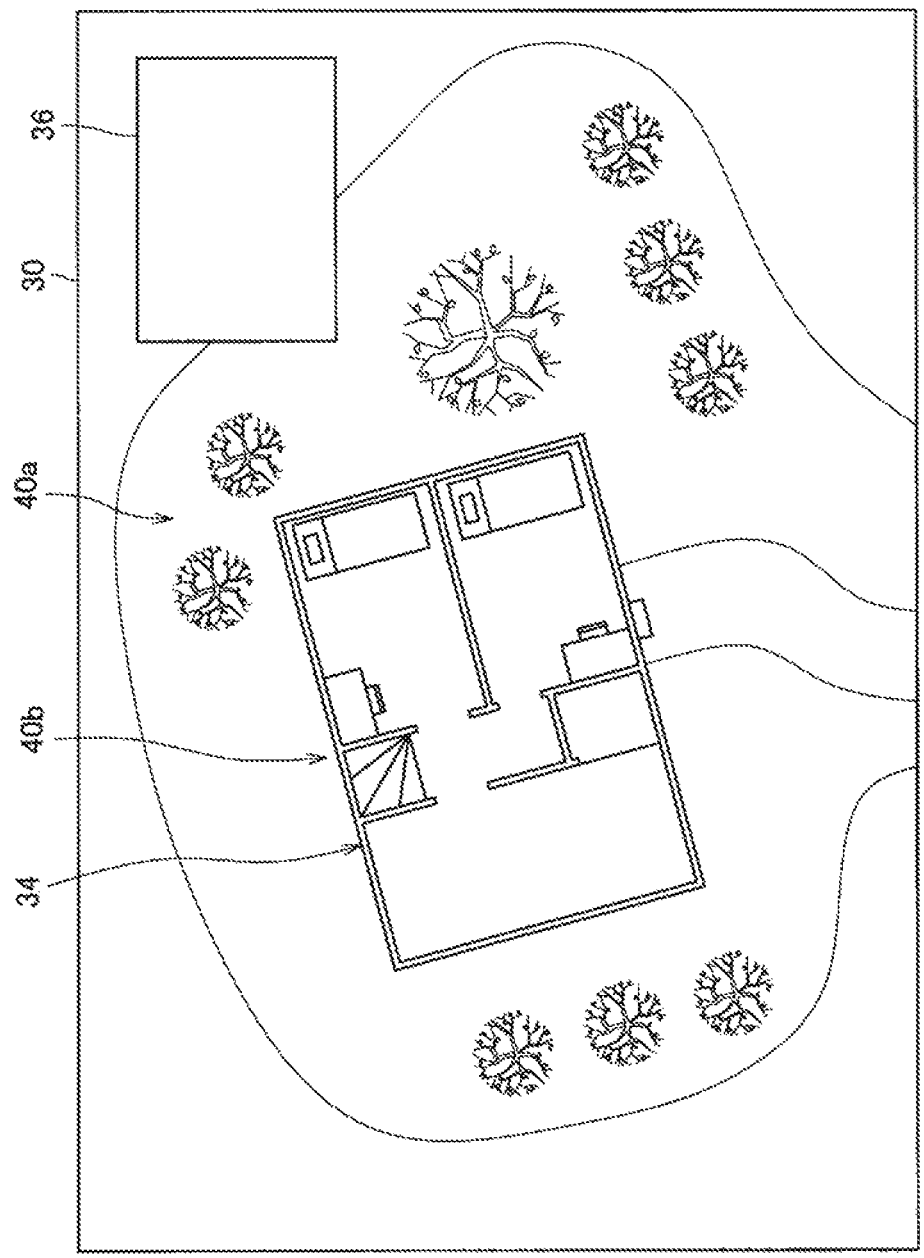
FIG. 16 is a diagram illustrating a projection example of a layout plan simulation application screen of real estate according to an application example 3 of the embodiment.
Figure 17:
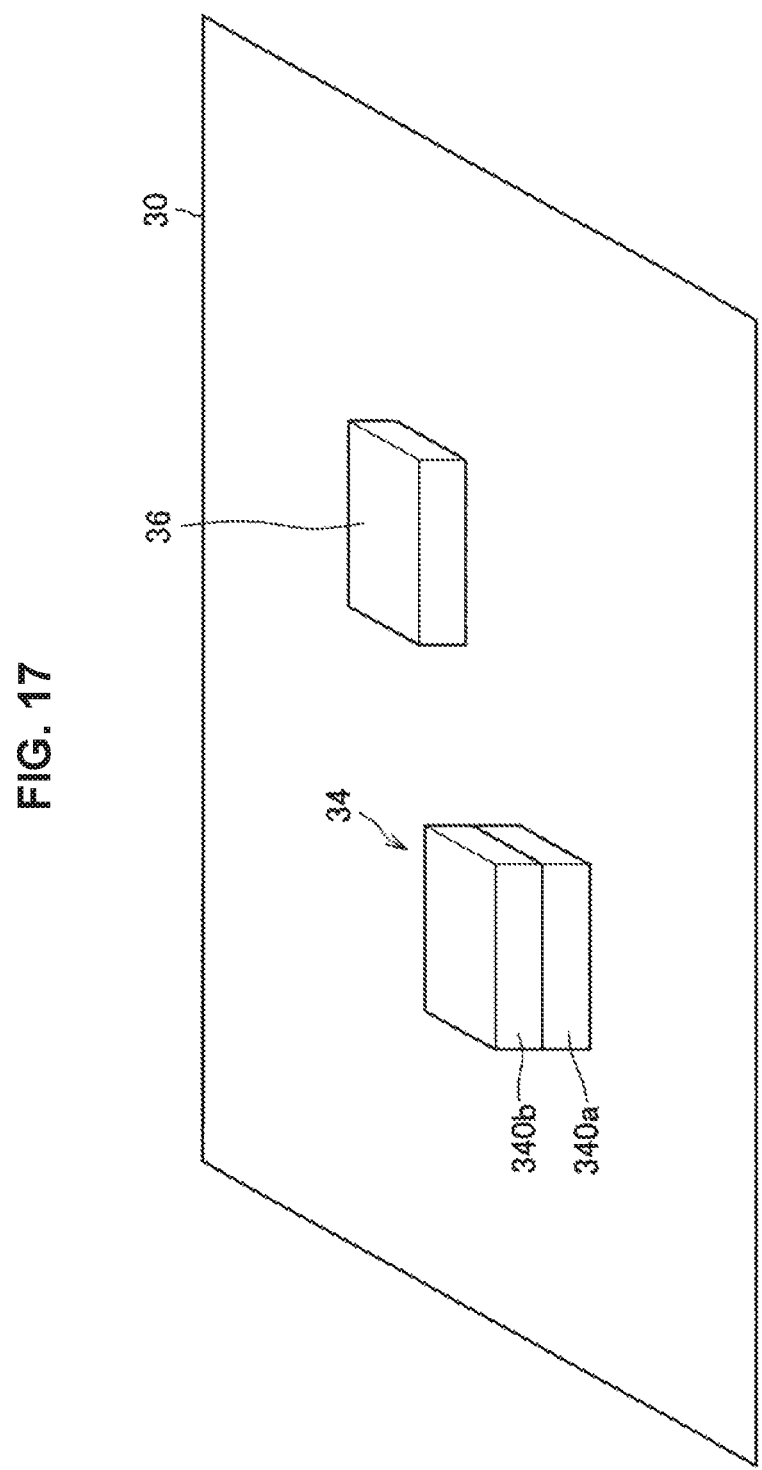
FIG. 17 is a diagram illustrating an example in which a stacked plate 34 and a screen object 36 are disposed on the projection surface 30 according to the application example 3.

Next, the application example 3 will be described. In the application example 3, for example, as shown in FIG. 16, a screen 40 of a layout plan simulation application of real estate (for example, a house or the like) is projected on the projection surface 30. As shown in FIG. 16, for example, an indoor image of one floor of the real estate and an image of a site such as a garden are displayed on the screen 40. In addition, in the application example 3, as shown in FIG. 17, a stacked plate 34 in which one or more plates 340 are stacked can be disposed on the projection surface 30. In addition, regarding the corresponding real estate, the indoor image of the floor according to a height of a top surface of the stacked plate 34 is projected on the top surface of the stacked plate 34. In addition, as shown in FIG. 17, a screen object 36 can be further disposed on the projection surface 30. As will be described later, an image (virtually) photographed by a camera tool is projected on the screen object 36.

(2-2-3-1. Association Unit 106)

In a case in which it is recognized that the finger touches the projection surface 30 or the stacked plate 34, the association unit 106 according to the application example 3 associates the finger with the camera tool (or a lighting tool).

(2-2-3-2. Change Unit 108)

In addition, the change unit 108 according to the application example 3 changes a direction parameter of the tool (for example, a gaze point direction in a case of the camera tool and a light irradiation direction in a case of the lighting tool) associated with the finger in accordance with the recognition result of the angle of the horizontal direction and the angle of the vertical direction of the finger recognized as the finger touching the projection surface 30 or the stacked plate 34. For example, in a case in which the camera tool is associated with the finger, the change unit 108 changes the gaze point direction of the horizontal direction of the camera tool in accordance with the angle of the horizontal direction of the finger with respect to the projection surface 30 or the stacked plate 34. In addition, in this case, the change unit 108 changes the gaze point direction of the vertical direction (up and down direction) of the camera tool in accordance with the angle of the vertical direction of the finger with respect to the projection surface 30 or the stacked plate 34.

In addition, in a case in which the lighting tool is associated with the finger, the change unit 108 changes a position of an incident light source (a horizontal incident angle of light) in accordance with the touch position of the finger with respect to the projection surface 30 or the stacked plate 34. In addition, in this case, the change unit 108 changes the angle of the incident light source (a vertical incident angle of light) in accordance with the angle of the vertical direction of the finger with respect to the projection surface 30 or the stacked plate 34.

(2-2-3-3. Display Control Unit 10)

Display Example 1

Figure 19:
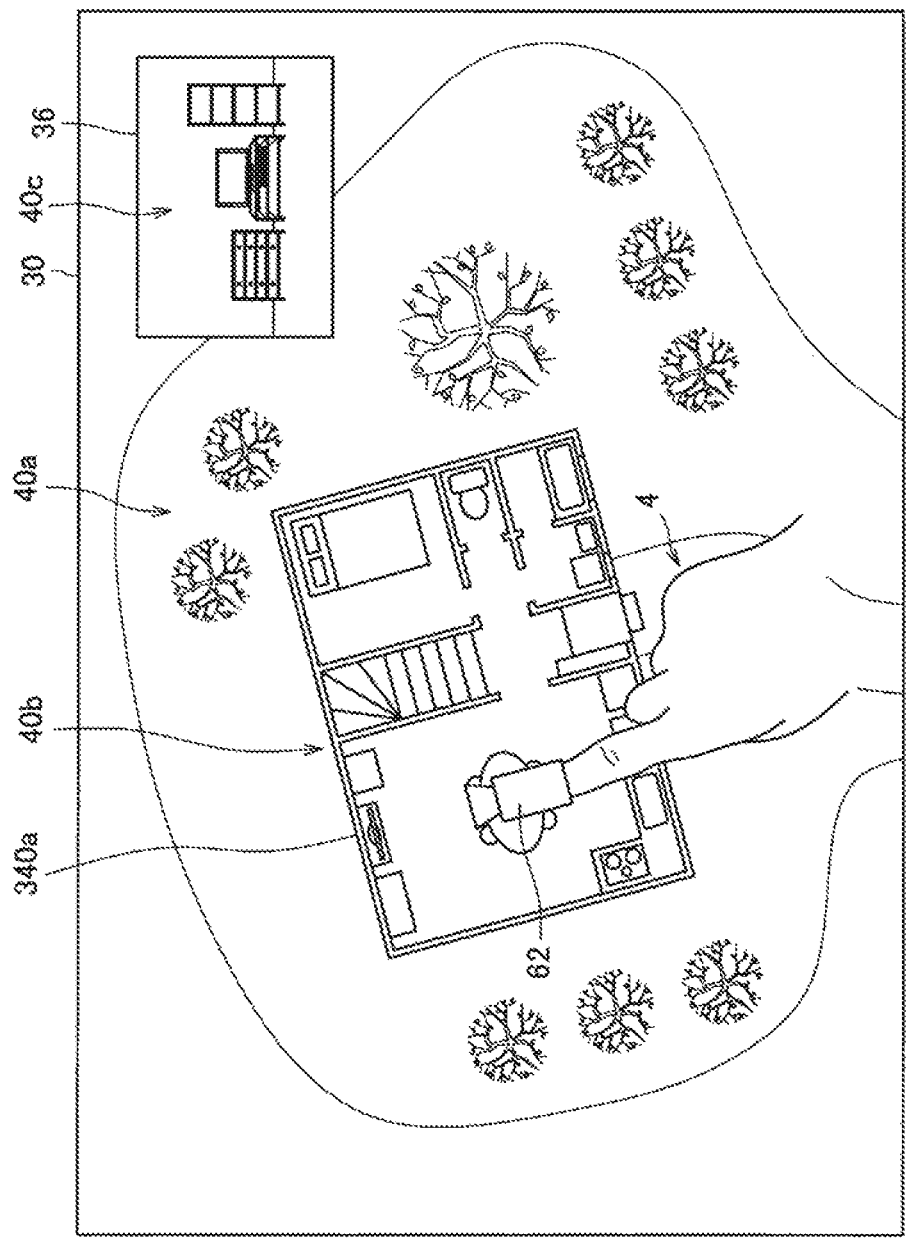
FIG. 19 is a diagram illustrating an example in which an indoor image of a first floor of the real estate is projected on the stacked plate 34 according to the application example 3.

In addition, the display control unit 110 according to the application example 3 causes the display unit 122 to project the screen 40 of the layout plan simulation application on the projection surface 30. For example, the display control unit 110 determines an image to be projected on the top surface of the stacked plate 34 on the basis of a recognition result of a distance between the top surface of the physical stacked plate 34 and the sensor unit 124. For example, as shown in FIG. 17, while two plates 340 are stacked as the stacked plate 34, as shown in FIG. 16, the display control unit 110 causes the display unit 122 to project an indoor image of a second floor of the real estate on the top surface of the stacked plate 34 (that is, a top surface of the plate 340b located at the top). In addition, in a case in which the user removes the plate 340b from a state shown in FIG. 16, as shown in FIG. 19, the display control unit 110 causes the display unit 122 to project the indoor image of the first floor of the real estate on the top surface of the stacked plate 34 (that is, the top surface of the plate 340a).

Display Example 2

Figure 18:
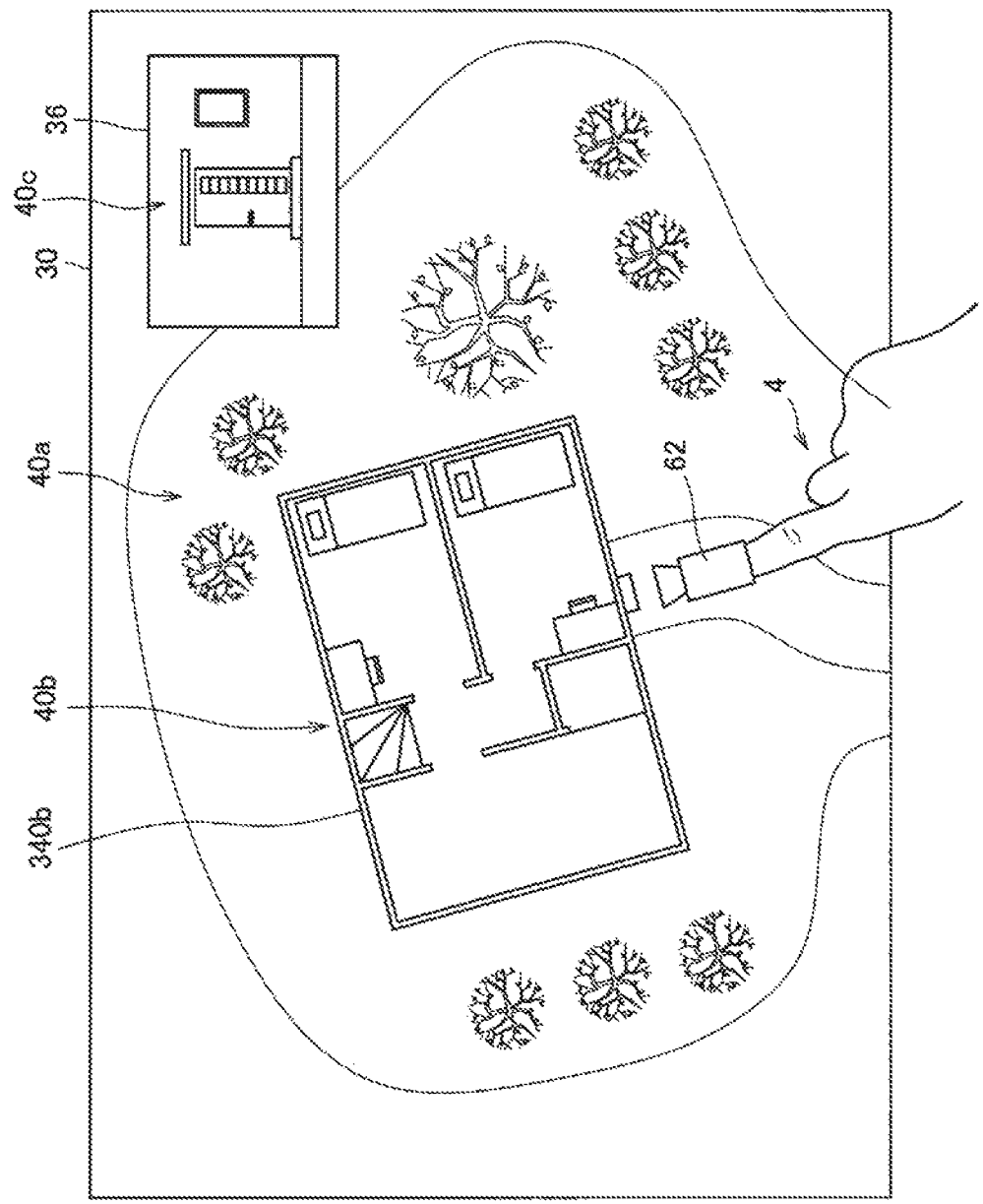
FIG. 18 is a diagram illustrating an example in which a camera image according to an inclination of the finger touching the projection surface 30 is projected on the screen object 36 according to the application example 3.

In addition, in a case in which the camera tool is associated with the finger and it is recognized that the finger touches the projection surface 30, the display control unit 110 causes the display unit 122 to project a camera image according to the gaze point direction changed by the change unit 108 on the screen object 36 (disposed on the projection surface 30), for example, as shown in FIG. 18. Note that, FIG. 18 shows an example in which an approach in the site is touched by the finger and an image (the camera image) photographed using a direction of a house as the gaze point direction from the approach is projected on the screen object 36.

According to this display example, in a case in which the user touches the site or the indoor image of the real estate projected on the projection surface 30, the camera image viewed from the touch position is projected on the screen object 36. In addition, the user can change the position of the camera tool or the gaze point direction to a desired position or direction and view walkthrough by changing the position or inclination of the finger.

Display Example 3

In addition, as shown in FIG. 18, the display control unit 110 is also able to cause the display unit 122 to display a GUI 62 indicating a type of the tool associated with the finger at the touch position (or in the vicinity of the touch position) of the finger recognized on the projection surface 30 or the stacked plate 34. According to this display example, the user can check the type of the tool associated with the finger at the same time.

(2-2-3-4. Modified Example)

Note that, normally, unless a direction of a body is changed, the user can only rotate the finger up to about 180° in the horizontal direction. Therefore, it is difficult to change the gaze point direction of the horizontal direction of the camera tool only to about 180°.

Figure 20:
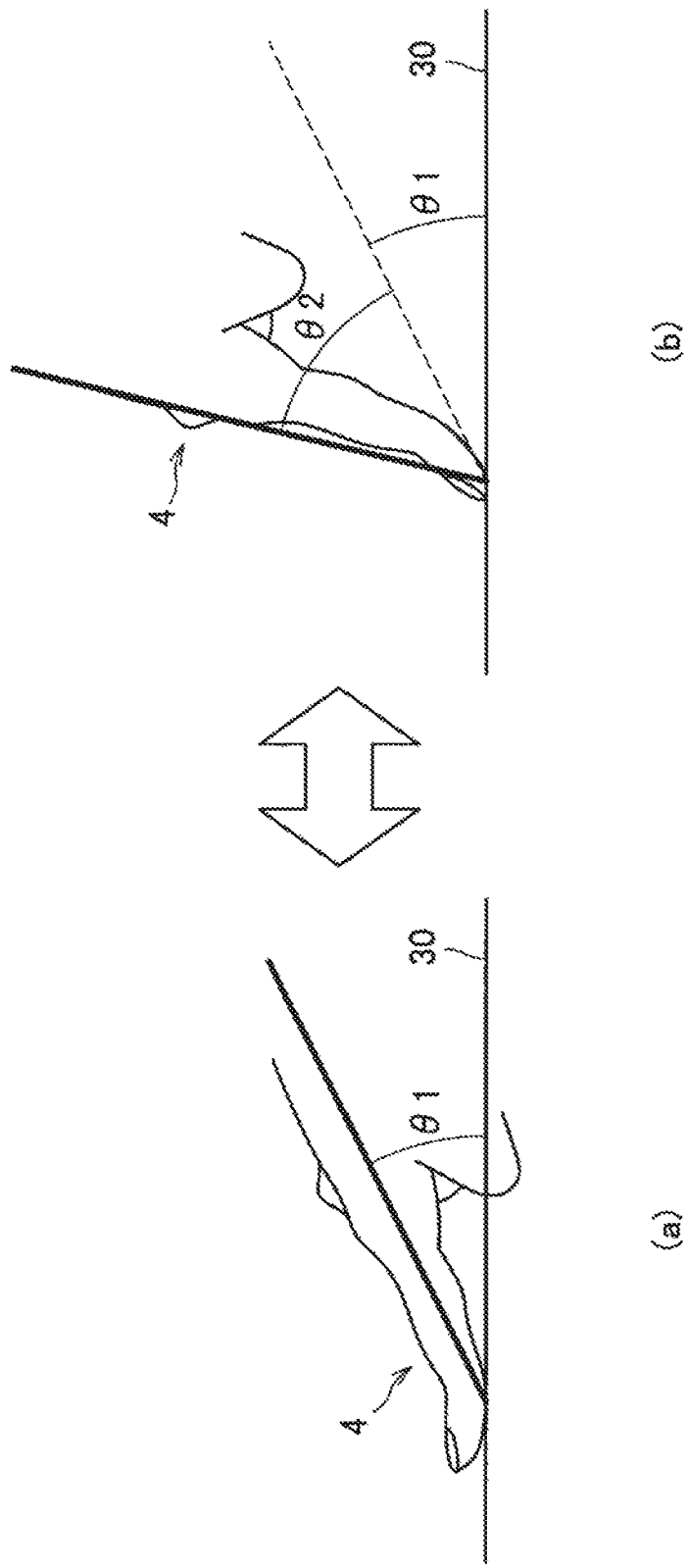
FIG. 20 is a diagram illustrating an example of an operation of repeatedly changing the angle of the vertical direction of the finger in a state in which the finger is touching the projection surface 30 according to the application example 3.
Figure 21:
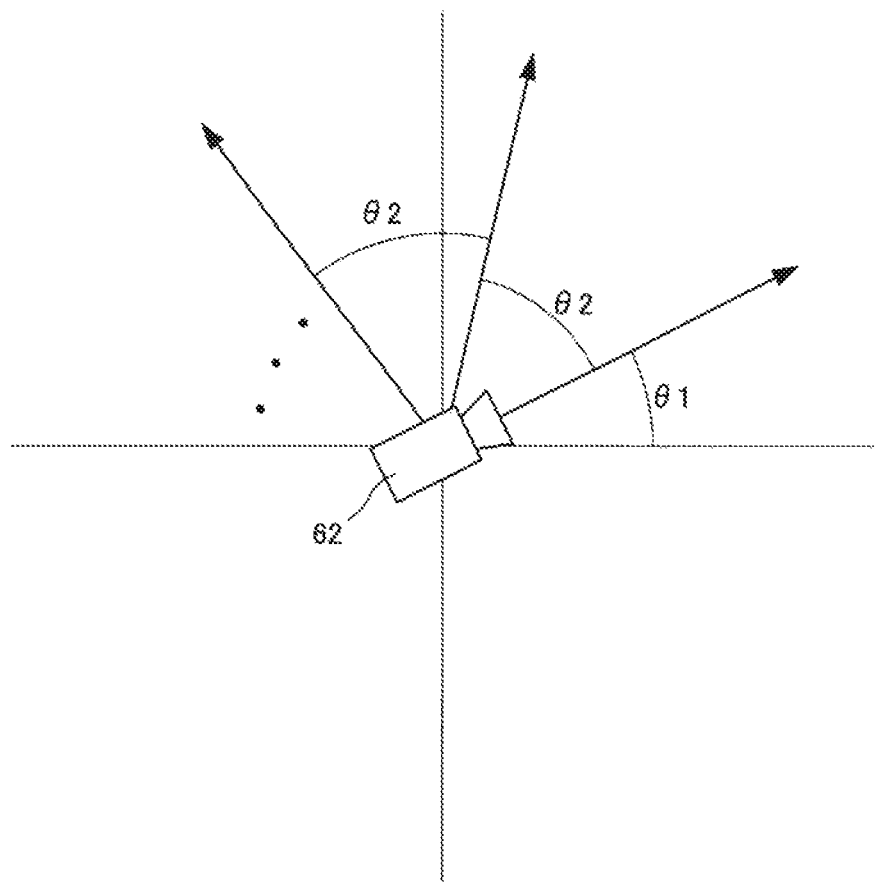
FIG. 21 is a diagram illustrating an example in which the angle of the horizontal direction of a camera tool is cumulatively changed by the operation shown in FIG. 20.

Therefore, as the modified example, in a range where a predetermined reset condition is not satisfied, as shown in FIG. 20, the change unit 108 is also able to cumulatively increase the angle of the horizontal direction of the camera tool on the basis of a recognition result of operation in a case in which the recognition unit 104 recognizes the operation of repeatedly changing the angle of the vertical direction of the finger in a state in which the finger touches on the projection surface 30 (or the stacked plate 34). For example, as shown in FIG. 21, each time the operation is recognized, the change unit 108 may increase the angle of the horizontal direction of the camera tool by a change amount (θ2 shown in FIG. 20) of the angle of the vertical direction by the operation. Note that, when the predetermined reset condition is satisfied, it can be recognized that the operation is ended.

Here, the predetermined reset condition may include the condition that the hand of the user moves outside a range that is able to be recognized by the information processing device 10 (for example, the sensor unit 124). In addition, for example, the predetermined reset condition can include the condition that that the hand of the user moves outside a predetermined region such as the projection range of a predetermined object (in the example shown in FIG. 16, the image of the site, or the like) projected on the projection surface 30. In addition, the predetermined reset condition can include the condition that the distance between the initial touch position of the repetitive operation and the current touch position is greater than or equal to a predetermined threshold value. In addition, the predetermined reset condition can include the condition that a specific gesture is recognized, for example, the user grips the hand to form a shape "rock".

According to this modified example, the user can rotate the angle of the horizontal direction of the camera tool by 360° only by easy operation using the finger. Note that, the present modified example is not limited to the camera tool, but, for example, the present modified example is also able to be applied to situations where the values of various parameters in various applications are changed, such as changing an irradiation direction of the lighting tool.

(2-2-3-5. Flow of Process)

Figure 22:
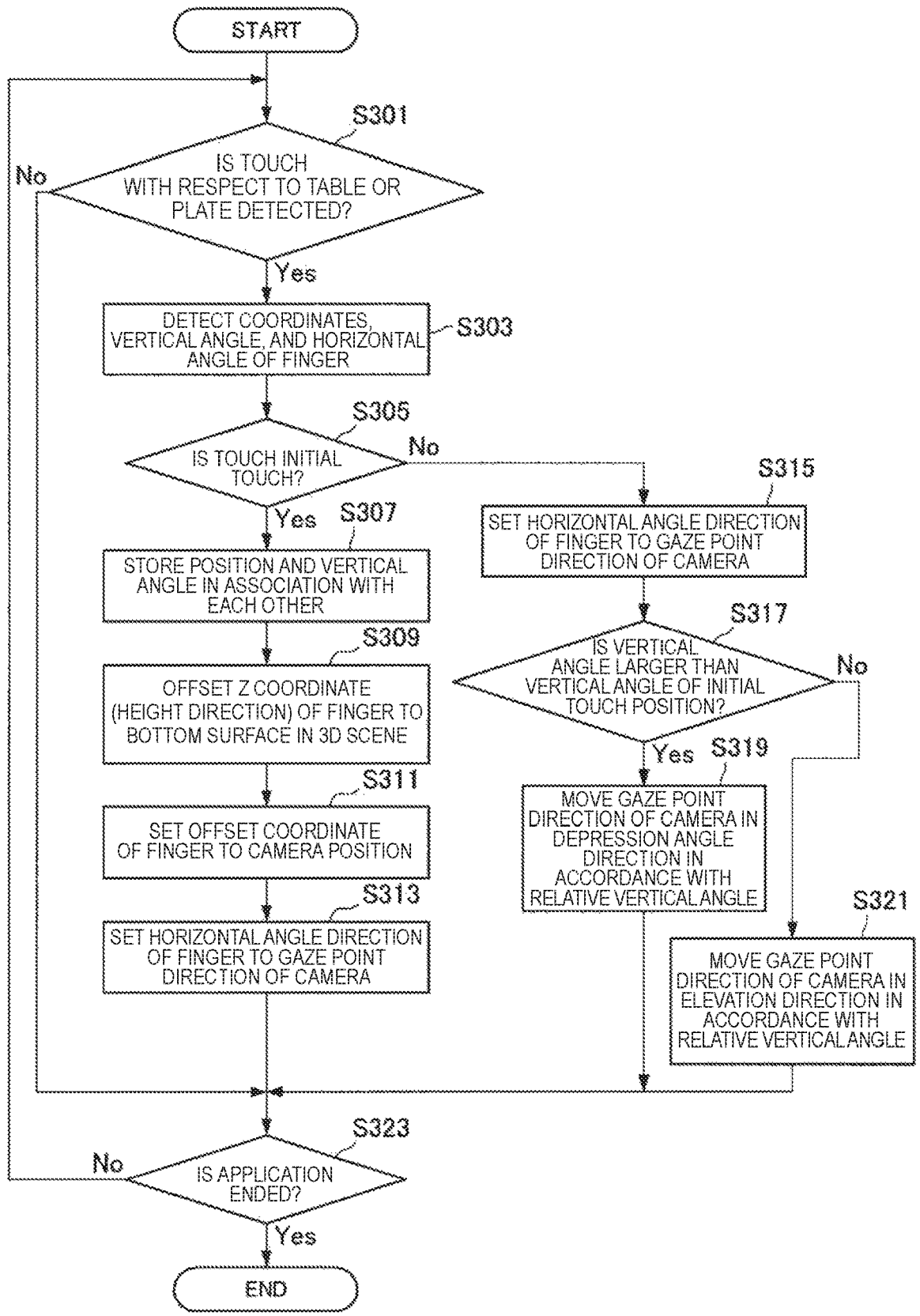
FIG. 22 is a flowchart illustrating a flow of a process according to the application example 3.

Here, the flow of the process according to the application example 3 will be described with reference to FIG. 22. As shown in FIG. 22, first, for example, the user selects a layout plan simulation application from among the plurality of applications stored in the storage unit 126, and activates the layout plan simulation application. Therefore, the display unit 122 projects the screen 40 of the layout plan simulation application on the projection surface 30 in accordance with the control of the display control unit 110.

Thereafter, the recognition unit 104 recognizes whether or not the finger touches the projection surface 30 or the stacked plate 34 already disposed on the projection surface 30 on the basis of the detection result by the sensor unit 124 (S301). In a case in which it is recognized that the finger does not touch the projection surface 30 and the stacked plate 34 (S301: No), the control unit 100 performs a process of S323 that will be described later.

On the other hand, in a case in which it is recognized that the finger touches the projection surface 30 or the stacked plate 34 (S301: Yes), the recognition unit 104 further recognizes touch coordinates of the finger with respect to the object recognized as the touched object, the (absolute) vertical angle of the finger with respect to the object, and the horizontal angle of the finger with respect to the object on the basis of the detection result (S303).

In addition, the control unit 100 determines whether or not the currently recognized touch is the initial touch (that is, whether or not the finger is separated from the projection surface 30 until just before) (S305). In a case in which the currently recognized touch is the initial touch (S305: Yes), the control unit 100 stores the position of the touch recognized in S303 and the vertical angle recognized in S303 in the storage unit 126 in association with each other (S307). Thereafter, for example, in a case in which the finger is touched on the stacked plate 34, the change unit 108 offsets a Z coordinate (a height direction) of the touch position of the finger to a bottom surface (a floor surface or the like) corresponding to the touch position of the finger in a 3D scene (S309).

Next, the association unit 106 associates the finger with the camera tool. In addition, the change unit 108 sets the coordinates of the finger after the offset to coordinates of the camera tool associated with the finger (S311).

Next, the change unit 108 sets the angle of the horizontal direction of the finger to the angle of the horizontal direction of the camera tool (S313).

Thereafter, the control unit 100 performs a process of S323 that will be described later.

On the other hand, in S305, in a case in which the currently recognized touch is not the initial touch (S305: No), the change unit 108 sets the angle of the horizontal direction of the finger to the angle of the horizontal direction of the camera tool associated with the finger (S315).

Next, the change unit 108 determines whether or not the vertical angle recognized in S303 is larger than the vertical angle at an initial touch stored in S307 (S317). In a case in which the vertical angle recognized in S303 is larger than the vertical angle at the initial touch (S317: Yes), the change unit 108 moves the gaze point direction of the camera tool associated with the finger in a depression angle direction in accordance with a relative value of the vertical angle recognized in S303 with reference to the vertical angle stored in S307. In addition, the display unit 122 projects the camera image according to the gaze point direction of the camera tool after the change on the screen object 36 disposed on the projection surface 30 in accordance with the control of the display control unit 110 (S319). In addition, the control unit 100 performs a process of S323 that will be described later.

On the other hand, in a case in which the vertical angle recognized in S303 is equal to or less than the vertical angle at the initial touch (S317: No), the change unit 108 moves the gaze point direction of the camera tool associated with the finger in an elevation direction in accordance with the relative value of the vertical angle recognized in S303 with reference to the vertical angle stored in S307. In addition, the display unit 122 projects the camera image according to the gaze point direction of the camera tool after the change on the screen object 36 disposed on the projection surface 30 in accordance with the control of the display control unit 110 (S321).

Thereafter, in a case in which the user performs an operation of ending the layout plan simulation application (S323: Yes), the process is ended. On the other hand, in a case in which the user does not perform the operation of ending the layout plan simulation application (S323: No), the control unit 100 performs the process of S301 and the subsequent processes again.

{2-2-4. Application Example 4}

Next, the application example 4 will be described. In the application example 4, a screen of a paint application that is able to perform drawing by touching the projection surface 30 with the finger is projected on the projection surface 30.

(2-2-4-1. Association Unit 106)

The association unit 106 according to the application example 4 associates the angle of the vertical direction of the finger with respect to the object with the type of the process to be executed, on the basis of the association table 50 as shown in FIG. 23. As shown in FIG. 23, in the association table 50, an angle 500 of the vertical direction of the finger with respect to the object, an operation type 510, and a value 512 of a parameter changed by a drag operation are associated with each other. In the example shown in FIG. 23, in a case in which the angle of the vertical direction of the finger with respect to the object is "equal to or greater than 0° and less than 30°" "color selection" is associated as the operation type, in a case in which the angle of the vertical direction of the finger is "equal to or greater than 30° and less than 60°", "pen type selection" is associated as the operation type, and in a case in which the angle of the vertical direction of the finger is "equal to or greater than 60° and equal to or less than 90°", "pen width selection" is associated as the operation type, respectively.

(2-2-4-2. Change Unit 108)

In addition, the change unit 108 according to the application example 4 changes the value of the parameter related to the type of the process associated with the finger on the basis of the inclination of the vertical direction of the finger with respect to the object and the recognition result of the drag operation. In the example shown in FIG. 23, in a case in which the angle of the vertical direction of the finger with respect to the object is "20°" and the finger is dragged by a distance "equal to or greater than w1 and less than w2", the change unit 108 changes a color of a line to be drawn to "green".

Here, the function described above will be described in more detail with reference to FIGS. 24 to 28. Note that, in an example shown in FIG. 24, a pen having a predetermined color, a predetermined type, and a predetermined width for drawing a line 42 is associated with a finger of a left hand 4a, and as shown in FIG. 24, the user draws the line 42 on the projection surface 30 on the basis of the touch operation of the left hand 4a with respect to the projection surface 30. It is assumed that the user wishes to change the pen type corresponding to the line 42 to a "fountain pen" during the drawing.

In this case, for example, in order to change the parameter related to the operation type associated with the finger of the left hand 4a, the user double taps the projection surface 30 with the finger of a right hand 4b. Note that it is assumed that the angle of the vertical direction of the finger of the right hand 4b at the time of the double tap is less than 30°.

Figure 25:
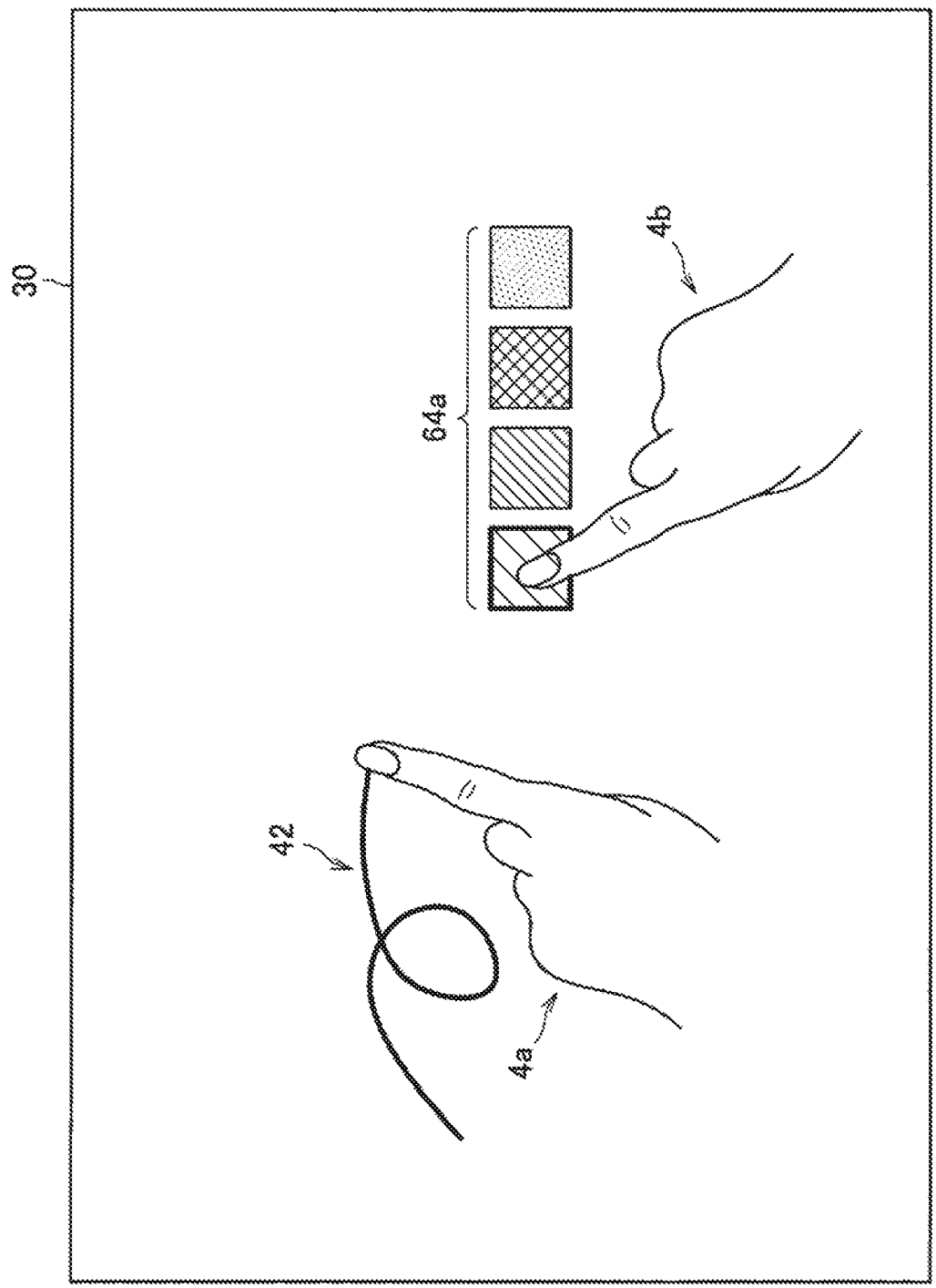
FIG. 25 is an explanatory diagram illustrating a part of an example in which a user changes a type of a line to be drawn according to the application example 4.

In this case, (since the angle of the vertical direction of the finger of the right hand 4b is less than 30°) as shown in FIG. 25, the display control unit 110 causes the display unit 122 to display a color selection menu 64a of the line 42 at a position of the finger of the right hand 4b on the projection surface 30.

Figure 26:
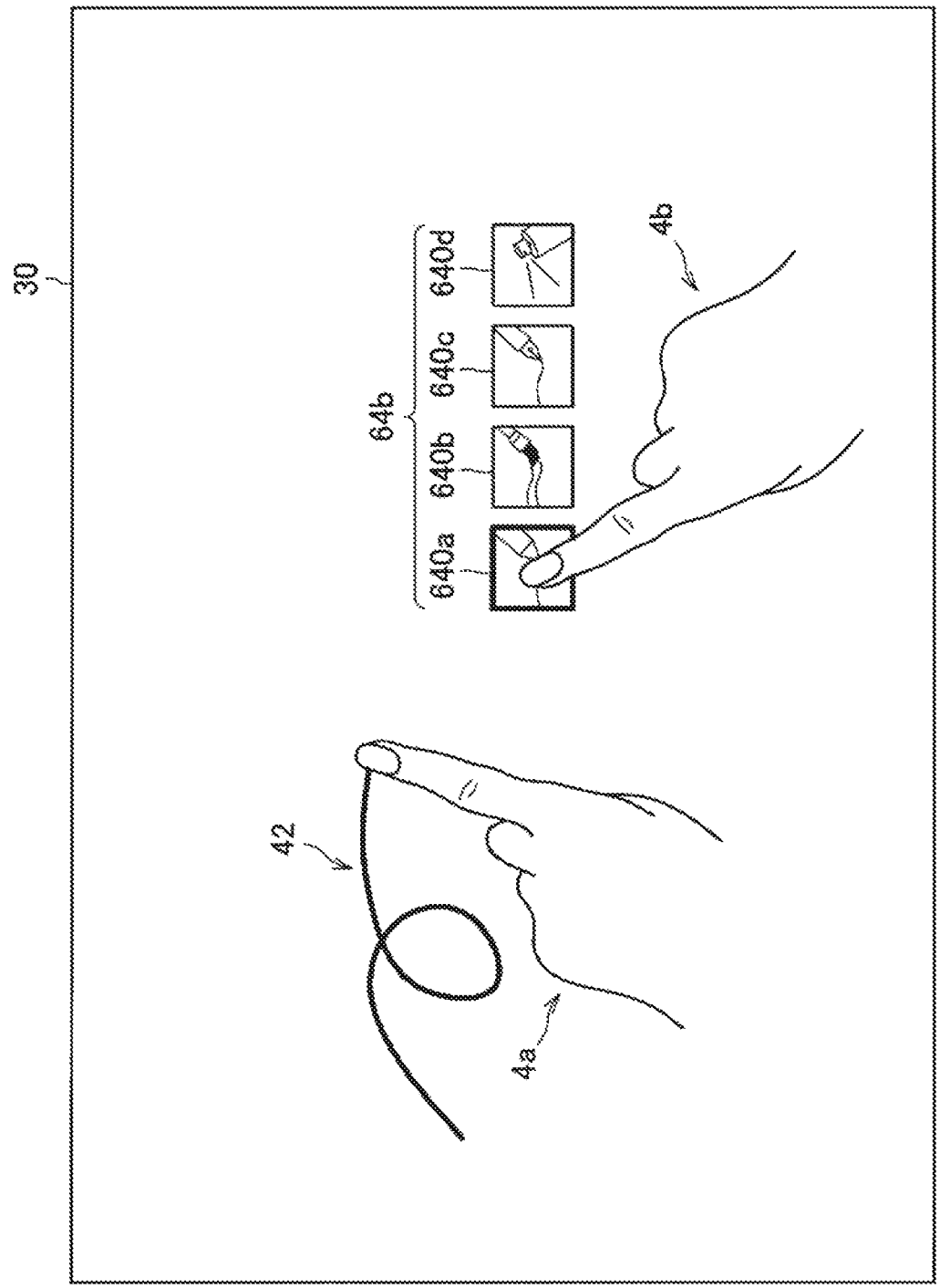
FIG. 26 is an explanatory diagram illustrating a part of an example in which a user changes a type of a line to be drawn according to the application example 4.

In addition, the user increases the angle of the vertical direction of the finger of the right hand 4b to equal to or greater than 30° and less than 60°. In this case, as shown in FIG. 26, the display control unit 110 causes the display unit 122 to display a pen type selection menu 64b for drawing of the line 42 instead of the color selection menu 64a.

Figure 27:
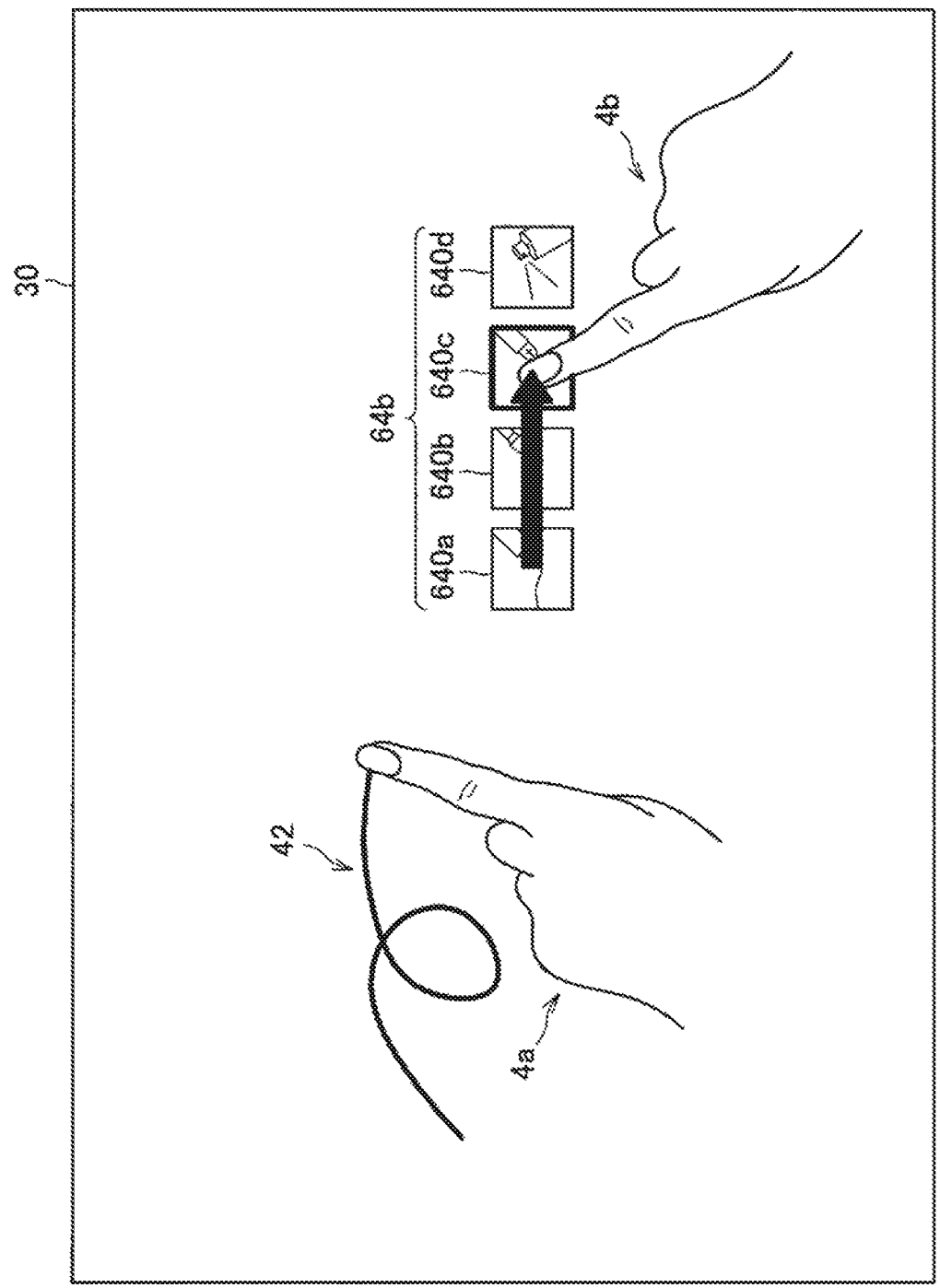
FIG. 27 is an explanatory diagram illustrating a part of an example in which a user changes a type of a line to be drawn according to the application example 4.

In addition, while watching the displayed pen type selection menu 64b, as shown in FIG. 27, the user drags the finger of the right hand 4b to a display position of a fountain pen selection icon 640c (more specifically, by a distance "equal to or greater than w2 and less than w3") and separates the finger of the right hand from the projection surface 30. In this case, the change unit 108 changes the pen type for drawing of the line 42, that is associated with the finger of the left hand 4a, to the "fountain pen". Therefore, by touch operation of the left hand 4a thereafter, the line 42 of which the pen type is the "fountain pen" (with the color and the pen width as they are) is drawn.

(2-2-4-3. Flow of Process)

Figure 28:
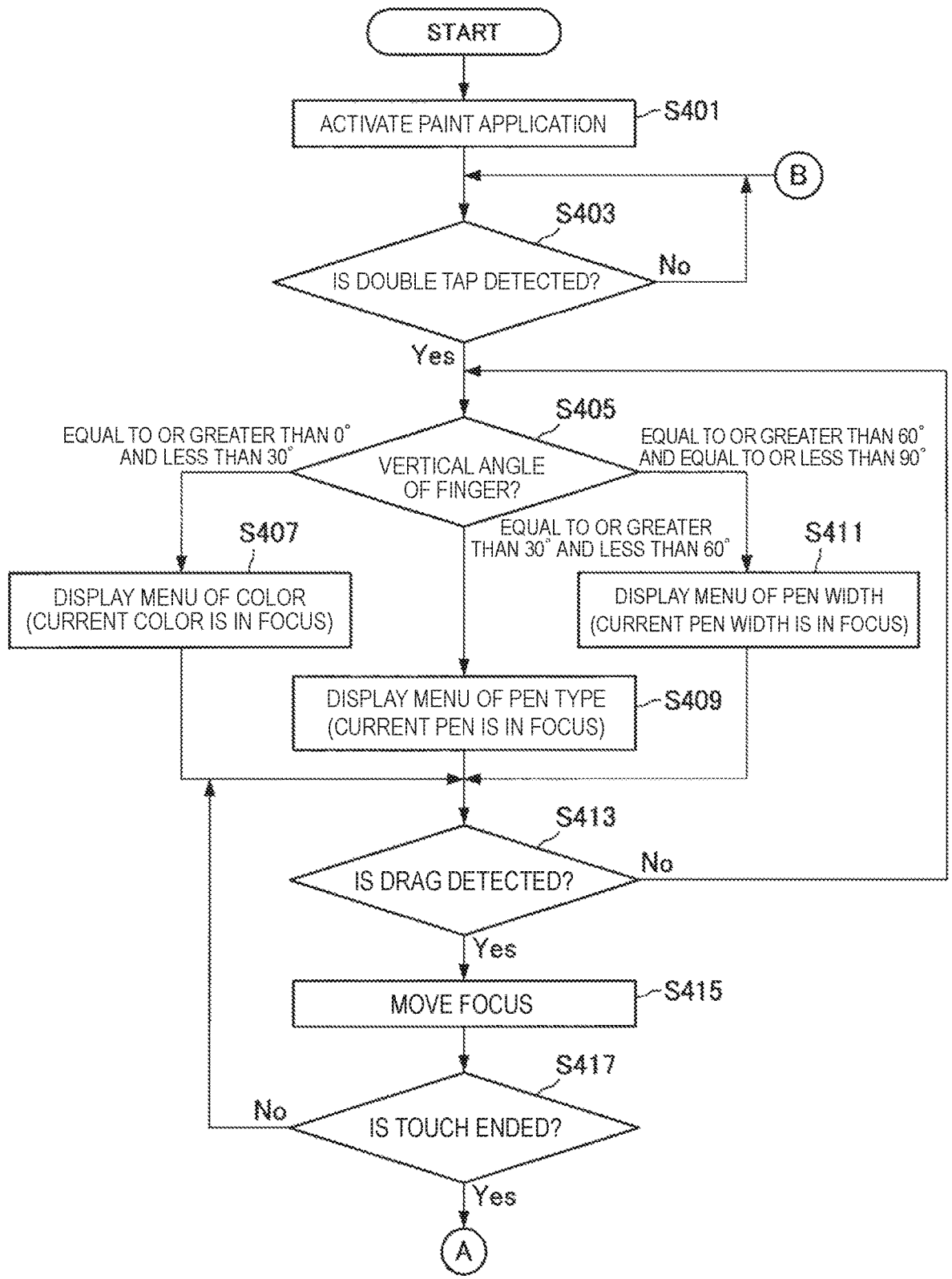
FIG. 28 is a flowchart illustrating a portion of a flow of a process according to the application example 4.
Figure 29:
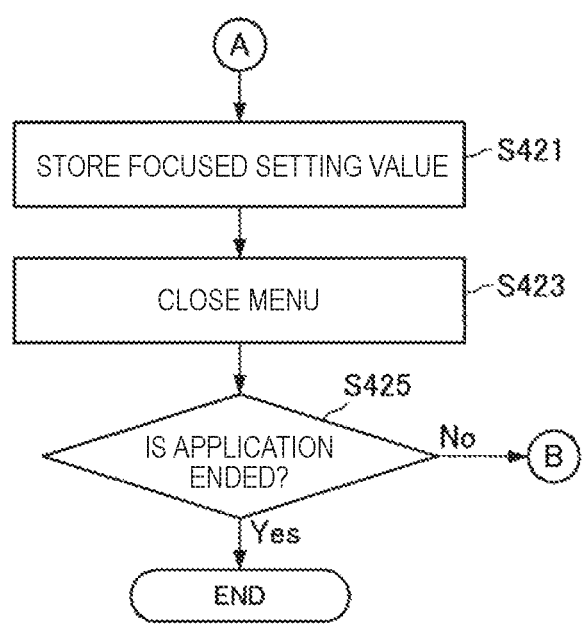
FIG. 29 is a flowchart illustrating a portion of a flow of a process according to the application example 4.

Here, the flow of the process according to the application example 4 will be described with reference to FIGS. 28 and 29. As shown in FIG. 28, first, for example, the user selects a paint application from among the plurality of applications stored in the storage unit 126, and activates the paint application (S401). Therefore, the display unit 122 projects a screen of the paint application on the projection surface 30 in accordance with the control of the display control unit 110.

Thereafter, the recognition unit 104 waits until the double tap on the projection surface 30 is recognized on the basis of the detection result by the sensor unit 124 (S403). In addition, in a case in which the double tap is recognized (S403: Yes), next, the recognition unit 104 recognizes the angle of the vertical direction of the finger performing the double tap (S405). In a case in which the angle of the vertical direction of the finger is "equal to or greater than 0° and less than 30°", the display control unit 110 causes the display unit 122 to project the color selection menu to a position of the finger on the projection surface 30. Note that, in the color selection menu, a current color is able to be displayed in focus (S407). Thereafter, the recognition unit 104 performs a process of S413 that will be described later.

On the other hand, in a case in which the angle of the vertical direction of the finger is "equal to or greater than 30° and less than 60°", the display control unit 110 causes the display unit 122 to project the pen type selection menu to the position of the finger on the projection surface 30. Note that, in the pen type selection menu, a current pen type is able to be displayed in focus (S409). Thereafter, the recognition unit 104 performs the process of S413 that will be described later.

On the other hand, in a case in which the angle of the vertical direction of the finger is "equal to or greater than 60° and equal to or less than 90°", the display control unit 110 causes the display unit 122 to project the pen width selection menu to the position of the finger on the projection surface 30. Note that, in the pen width selection menu, a current pen width is able to be displayed in focus (S411).

Thereafter, the recognition unit 104 recognizes whether or not the drag operation of the finger with respect to the projection surface 30 is performed on the basis of the detection result by the sensor unit 124 (S413). In a case in which the drag operation of the finger is not recognized (S413: No), the recognition unit 104 performs the process of S405 again.

On the other hand, in a case in which the drag operation of the finger is recognized (S413: Yes), the display control unit 110 moves the focus position in the menu projected by the display unit 122 in S407, S409, or S411 on the basis of the recognized drag operation (S415).

Thereafter, the recognition unit 104 recognizes whether or not the finger is separated from the projection surface 30 (S417). In a case in which it is recognized that the finger is not separated from the projection surface 30 (S417: No), the recognition unit 104 performs the process of S413 again.

Here, a flow of a process in a case in which it is recognized that the finger is separated from the projection surface 30 (S417: Yes) will be described with reference to FIG. 29. As shown in FIG. 29, the change unit 108 changes the value of the parameter (the color, the pen type, or the pen width) corresponding to the corresponding menu to the value corresponding to the position at which the finger is touched immediately before the finger is separated in S417 in the corresponding menu. In addition, the change unit 108 stores the value of the parameter after the change in the storage unit 126 (S421).

Next, the display unit 122 does not display the corresponding menu in accordance with the control of the display control unit 110 (S423).

Thereafter, in a case in which the user performs an operation of ending the paint application (S425: Yes), the process is ended. On the other hand, in a case in which the user does not perform the operation of ending the paint application (S425: No), the control unit 100 performs the process of S403 and the subsequent processes again.

<2-4. Effect>

{2-4-1. Effect 1}

As described above, the information processing device 10 according to the present embodiment acquires the recognition result of the inclination of the finger with respect to the object when it is recognized that the finger touches the object and changes the value of the parameter related to the process to be executed on the basis of the recognition result. Therefore, the user can intuitively and easily set the value of the parameter to a desired value by changing the inclination of the finger with respect to the object.

{2-4-2. Effect 2}

In addition, according to the present embodiment, it is possible to accurately recognize the angle of the vertical direction of the finger with respect to an arbitrary object although a special sensor is not attached to the object or a body of the user. Therefore, it is possible to realize interactive applications of various uses. For example, the information processing device 10 is able to produce an expression as if a pressure according to the recognized angle is applied to the object in accordance with the recognition result of the angle of the vertical direction of the finger with respect to an arbitrary object.

In addition, since the operation is able to be performed by only the touch of the finger with respect to the projection surface 30, it is easy for a plurality of users to perform the operation at the same time.

{2-4-3. Effect 3}

In addition, according to the present embodiment, the user can seamlessly switch the mode or change the value of the parameter by changing the angle of the finger while performing the touch operation. Therefore, work efficiency of the user is improved.

{2-4-4. Effect 4}

In addition, according to the present embodiment, since a dedicated hardware tool is unnecessary, it is possible to inexpensively introduce the system.

{2-4-5. Effect 5}

In addition, according to the present embodiment, it is possible to intuitively operate a desired application, such as availability of performing sculpting using both hands. For example, compared to the related art, it is possible to more intuitively and more easily perform various operations such as designation of the gaze point direction of the camera tool in the 3DCG application.

3. Hardware Configuration

Figure 30:
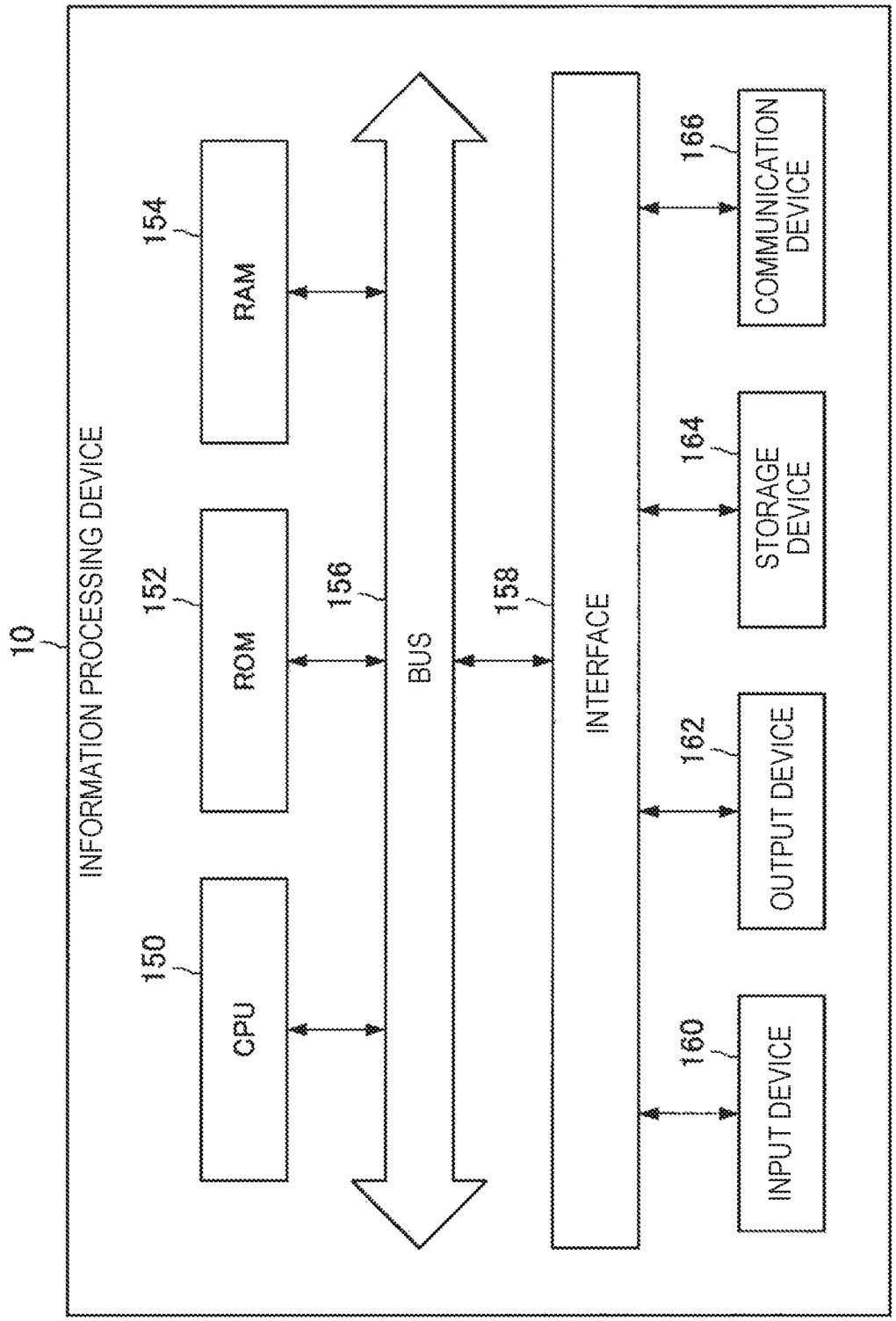
FIG. 30 is an explanatory diagram illustrating an example of a hardware configuration of the information processing device 10 according to the embodiment.

Next, a hardware configuration of the information processing device 10 according to the present embodiment will be described with reference to FIG. 30. As illustrated in FIG. 30, the information processing device 10 includes a CPU 150, a Read Only Memory (ROM) 152, a RAM 154, a bus 156, an interface 158, an input device 160, an output device 162, a storage device 164, and a communication device 166.

The CPU 150 functions as an arithmetic processing unit and a control unit, and controls an overall operation of the information processing device 10 in accordance with various kinds of programs. Further, the CPU 150 implements the function of the control unit 100 in the information processing device 10. Further, the CPU 150 is constituted by a processor such as a microprocessor.

The ROM 152 stores, for example, control data such as a program, an operation parameter, and the like used by the CPU 150.

The RAM 154 temporarily stores, for example, a program executed by the CPU 150.

The bus 156 is constituted by a CPU bus or the like. The bus 156 connects the CPU 150, the ROM 152, and the RAM 154.

The interface 158 connects the input device 160, the output device 162, the storage device 164, and the communication device 166 to the bus 156.

The input device 160 includes an input unit in which the user inputs information such as, for example, a touch panel, a button, a switch, a dial, a lever, a microphone, or the like, an input control circuit that generates an input signal on the basis of an input by user and outputs the input signal it to the CPU 150.

The output device 162 includes a projector or a display device such as a display such as a liquid crystal display (LCD: light emitting diode) or an organic light emitting diode (OLED). Further, the output device 162 includes a voice output device such as a speaker.

The storage device 164 is a data storage device functioning as the storage unit 126. The storage device 164 includes, for example, a storage medium, a recording device for recording data in a storage medium, a reading device for reading data from a storage medium, a deletion device for deleting data recorded in a storage medium, and the like.

The communication device 166 is a communication interface constituted by a communication device or the like for establishing a connection with, for example, a communication network 22 or the like. Further, the communication device 166 may be a communication device that supports a wireless LAN, a communication device that supports Long Term Evolution (LTE), or a wire communication device that performs communication in a wired manner. This communication device 166 functions as the communication unit 120.

4. Modified Example

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

<4-1. Modified Example 1>

For example, in the embodiment described above, an example applied to a situation in which the value of parameter related to display of an image or production of an image are mainly changed has been described, but the present disclosure is not limited to these examples. For example, the present disclosure is able to be substantially similarly applied to a situation in which music is performed or music is produced.

Figure 31:
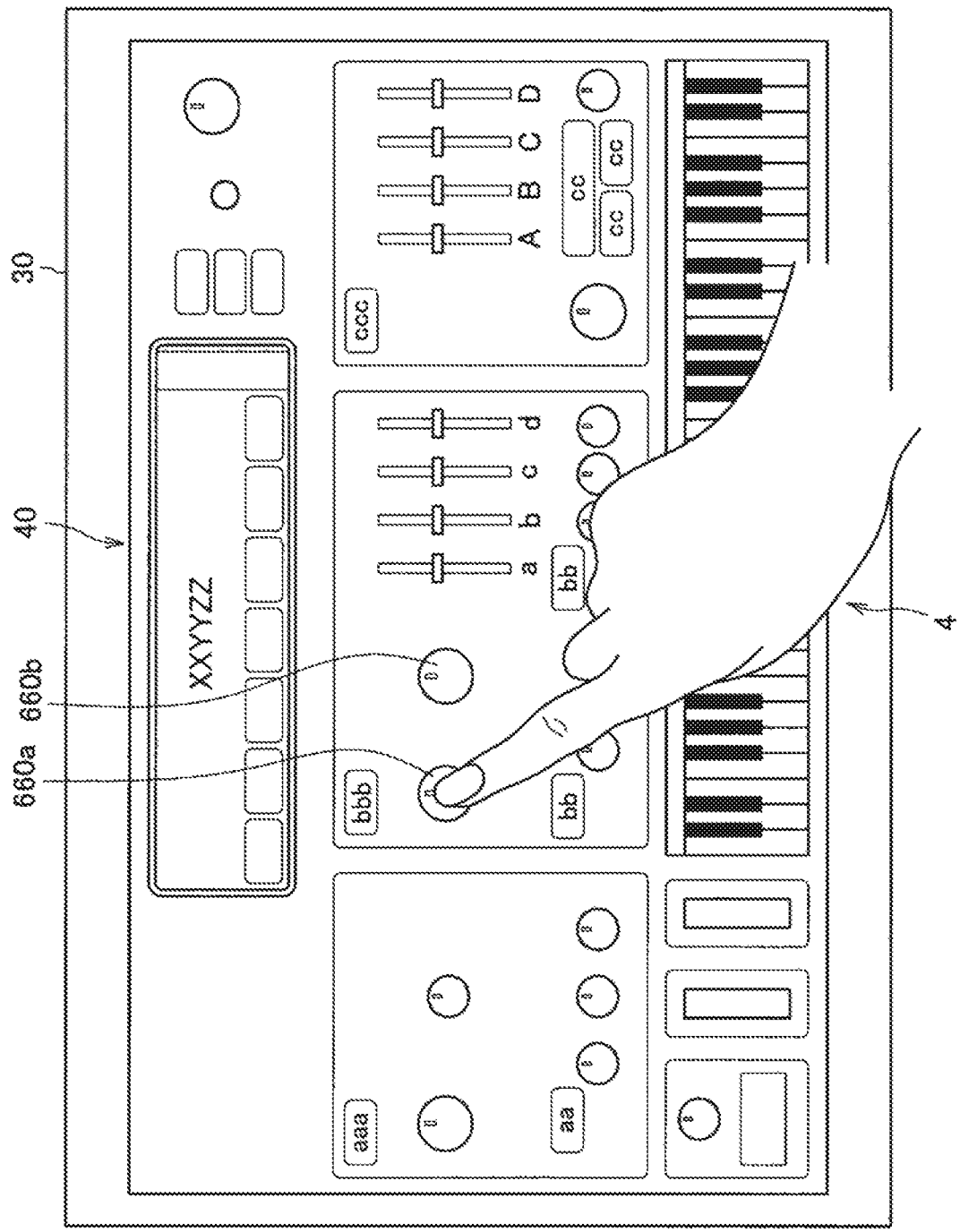
FIG. 31 is a diagram illustrating a projection example of a screen 40 of a music production tool according to a modified example.

As an example, the information processing device 10 is able to project a screen 40 of a music production tool as shown in FIG. 31 on the projection surface 30 and change values of various parameters related to music production on the basis of the recognition result of the inclination of the finger with respect to the projection surface 30. For example, the information processing device 10 may associate the vertical angle of the finger with respect to the projection surface 30 at the time of operation of a keyboard with a velocity value. In addition, as shown in FIG. 31, the information processing device 10 may change a value of a parameter (for example, volume or the like) corresponding to a rotation switch 660 on the basis of the recognition result of the horizontal angle of the finger recognized as the finger touching a projection position (or the vicinity of the position) of the rotation switch 660 of a knob type.

<4-2. Modified Example 2>

In addition, in the embodiment described above, an example in which the display unit 122 projects an image on the projection surface 30 has been described, but the present disclosure is not limited thereto. For example, the display unit 122 may be a glasses type display, and the information processing device 10 may display the image to be displayed on the display unit 122. In this case, the display unit 122 may be a transmission type display or a non-transmission type display. In the latter case, an image in front of the display unit 122 is able to be photographed by a camera attached to the display unit 122. In addition, the information processing device 10 is able to superimpose the image to be displayed on the image photographed by the camera and display the image on the display unit 122.

<4-3. Modified Example 3>

In addition, the configuration of the information processing system according to the present embodiment is not limited to the example shown in FIG. 1. For example, although only one information processing device 10 is shown in FIG. 1, the present disclosure is not limited to this example, and a plurality of computers cooperatively operate to realize the functions of the above-described information processing device 10.

<4-4. Modified Example 4>

In addition, the configuration of the information processing device 10 is not limited to the example shown in FIG. 2. For example, instead one or more of the display unit 122 and the sensor unit 124 are included in the information processing device 10, the one or more of the display unit 122 and the sensor unit 124 may be included in another apparatus with which the information processing device 10 is able to communicate. In this case, furthermore, the information processing device 10 may be another type of apparatus rather than the projector unit as shown in FIG. 1. For example, the information processing device 10 may be a general-purpose personal computer (PC), a tablet terminal, a game machine, a portable telephone such as a smart phone, a portable music player, a robot, or, for example, a wearable device such as a head mounted display (HMD), a headset, or a smart watch.

Alternatively, in this case, the information processing device 10 and the server 20 may be configured as the same apparatus.

<4-5. Modified Example 5>

Further, steps in the flow of the process in each modified example described above need not be necessarily processed in the described order. For example, steps may be processed in a properly changed order. Further, steps may not be processed chronologically but may be processed in parallel or individually. Further, some of steps described may be omitted, or another step may be added.

Further, according to the above embodiment, it is also possible to provide a computer program causing hardware such as the CPU 150, the ROM 152, the RAM 154, and the like to perform the same functions as each component of the information processing device 10 according to the above-described embodiment. Further, a recording medium in which the computer program is recorded is also provided.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing system including:

an acquisition unit configured to acquire a recognition result of an inclination of a hand with respect to an object when it is recognized that the hand is touching the object; and a change unit configured to change a value of a parameter related to a process to be executed on the basis of the recognition result.

(2)

The information processing system according to (1), in which the process is a process related to display of an image.

(3)

The information processing system according to (1) or (2), in which the change unit changes a value of a parameter associated with the object on the basis of the recognition result.

(4)

The information processing system according to any one of (1) to (3), in which the chance unit changes a value of a parameter associated with the hand on the basis of the recognition result.

(5)

The information processing system according to any one of (1) to (4), in which the change unit changes a value of a parameter related to an object associated with the object or the hand on the basis of the recognition result.

(6)

The information processing system according to any one of (1) to (5), in which the inclination of the hand with respect to the object includes an inclination of the hand in a vertical direction with respect to the object.

(7)

The information processing system according to (6), in which the change unit changes a value of a first parameter on the basis of a recognition result of the inclination of the hand in the vertical direction with respect to the object and changes a value of a second parameter different from the first parameter on the basis of a recognition result of an inclination of the hand in a horizontal direction with respect to the object.

(8)

The information processing system according to any one (1) of (6), in which it is recognized that the one or more hands are touching the object, and the change unit changes a value of a parameter associated with a second finger of any of the one or more hands, on the basis of a recognition result of an inclination of a first finger of any of the one or more hands with respect to the object.

(9)

The information processing system according to any one of (1) to (6), in which it is recognized that the one or more hands are touching the object, and the change unit changes a value of a first parameter on the basis of a recognition result of an inclination of a first finger of any of the one or more hands with respect to the object and changes a value of a second parameter different from the first parameter on the basis of a recognition result of an inclination of a second finger of any of the one or more hands with respect to the object.

(10)

The information processing system according to any one of (1) to (6), in which the change unit further changes the value of the parameter at a rate of change according to the number of fingers recognized as fingers touching the object.

(11)

The information processing system according to any one of (1) to (10), in which the acquisition unit further acquires a recognition result of an operation of repeatedly changing an inclination of the hand in a vertical direction with respect to the object, and the change unit cumulatively changes the value of the parameter on the basis of the recognition result of the operation.

(12)

The information processing system according to (11), in which whether or not the operation is ended is determined on the basis of a predetermined condition.

(13)

The information processing system according to (12), in which the predetermined condition includes a condition that the hand is moved from an inside of a predetermined region to an outside of the predetermined region.

(14)

The information processing system according to (12) or (13), in which the predetermined condition includes a condition that a predetermined gesture of the hand is recognized.

(15)

The information processing system according to any one of (1) to (14), further including:

a display control unit configured to cause a display unit to display information indicating the recognition result at a display position according to a position of the hand.

(16)

The information processing system according to any one of (1) to (14), further including:

a display control unit configured to cause a display unit to display information indicating a type of the parameter at a display position according to a position of the hand.

(17)

The information processing system according to any one of (1) to (14), in which the parameter is a parameter related to a photographing direction of a camera tool or an irradiation direction of a lighting tool, and the information processing system further includes a display control unit configured to cause a display unit to display an image according to the photographing direction of the camera tool or the irradiation direction of the lighting tool.

(18)

The information processing system according to any one of (1) to (17), in which the parameter is a parameter related to a shape of an object displayed by a display unit.

(19)

An information processing method including:

acquiring a recognition result of an inclination of a hand with respect to an object when it is recognized that the hand is touching the object; and changing, by a processor, a value of a parameter related to a process to be executed on the basis of the recognition result.

(20)

A program that causes a computer to function as:

an acquisition unit configured to acquire a recognition result of an inclination of a hand with respect to an object when it is recognized that the hand is touching the object; and a change unit configured to change a value of a parameter related to a process to be executed on the basis of the recognition result.

REFERENCE SIGNS LIST 10 information processing device
20 server
22 communication network
100 control unit
102 detection result acquisition unit
104 recognition unit
106 association unit
108 change unit
110 display control unit
120 communication unit
122 display unit
124 sensor unit
126 storage unit

The invention claimed is:

1. An information processing system comprising:
circuitry configured to
acquire a recognition result of an inclination of a finger with respect to an object when the finger is recognized to be touching a surface of the object; and
change a value of a parameter related to a process to be executed on a basis of the recognition result,
wherein the inclination of the finger with respect to the object includes an angle at which the finger is inclined in a vertical direction with respect to the surface of the object, and
wherein the circuitry is further configured to change a value of a first parameter on a basis of a recognition result of the angle at which the finger is inclined in the vertical direction to a horizontal surface of the object and change a value of a second parameter different from the first parameter on a basis of a recognition result of an angle at which the finger is inclined in a horizontal direction to a reference plane perpendicular to the horizontal surface of the object.

2. The information processing system according to claim 1, wherein the process is a process related to display of an image.

3. The information processing system according to claim 1, wherein the circuitry is further configured to change a value of a parameter associated with the object on the basis of the recognition result.

4. The information processing system according to claim 1, wherein the circuitry is further configured to change a value of a parameter associated with the finger on the basis of the recognition result.

5. The information processing system according to claim 1, wherein the circuitry is further configured to change a value of a parameter related to an object associated with the object or the finger on the basis of the recognition result.

6. The information processing system according to claim 1, wherein when one or more fingers are recognized to be touching the object, the circuitry is further configured to change a value of a parameter associated with a second finger of any of the one or more fingers, on a basis of a recognition result of an inclination of a first finger of any of the one or more fingers with respect to the object.

7. The information processing system according to claim 1, wherein the circuitry is further configured to change the value of the parameter at a rate of change according to a number of fingers recognized as fingers touching the object.

8. The information processing system according to claim 1, wherein the circuitry is further configured to
  acquire a recognition result of an operation of repeatedly changing an inclination of the finger in a vertical direction with respect to the object, and
  change the value of the parameter on a basis of the recognition result of the operation.

9. The information processing system according to claim 8, wherein whether or not the operation is ended is determined on a basis of a predetermined condition.

10. The information processing system according to claim 9, wherein the predetermined condition includes a condition that the finger is moved from an inside of a predetermined region to an outside of the predetermined region.

11. The information processing system according to claim 9, wherein the predetermined condition includes a condition that a predetermined gesture of the finger is recognized.

12. The information processing system according to claim 1, wherein the circuitry is further configured to
  cause a display unit to display information indicating the recognition result at a display position according to a position of the finger.

13. The information processing system according to claim 1, wherein the circuitry is further configured to
  cause a display unit to display information indicating a type of the parameter at a display position according to a position of the finger.

14. The information processing system according to claim 1, wherein the parameter is a parameter related to a photographing direction of a camera tool or an irradiation direction of a lighting tool, and
  the circuitry is further configured to
  cause a display unit to display an image according to the photographing direction of the camera tool or the irradiation direction of the lighting tool.

15. The information processing system according to claim 1, wherein the parameter is a parameter related to a shape of an object displayed on a display unit.

16. The information processing system according to claim 1, wherein the circuitry is further configured to change the value of the parameter at a rate of change according to a number of users recognized as users touching the object.

17. The information processing system according to claim 1, wherein the circuitry is further configured to change the value of the parameter at a rate of change according to a thickness of the finger recognized to be touching the surface of the object.

18. The information processing system according to claim 1, wherein when a plurality of fingers are recognized to be touching the object, the circuitry is further configured to change a value of one parameter on a basis of a recognition result of an angle at which one finger of the plurality of fingers is inclined in the vertical direction with respect to the surface of the object and change a value of another parameter different from the one parameter on a basis of a recognition result of an angle at which another finger of the plurality of fingers is inclined in the vertical direction with respect to the surface of the object, the another finger being different than the one finger.

19. An information processing method comprising:
  acquiring a recognition result of an inclination of a finger with respect to an object when the finger is recognized to be touching a surface of the object;
  changing, by a processor, a value of a parameter related to a process to be executed on a basis of the recognition result;
  changing, by the processor and when a plurality of fingers are recognized to be touching the object, a value of one parameter on a basis of a recognition result of an angle at which one finger of the plurality of fingers is inclined in a vertical direction with respect to the surface of the object; and
  changing, by the processor, a value of a first parameter on a basis of a recognition result of the angle at which the finger is inclined in the vertical direction to a horizontal surface of the object and change a value of a second parameter different from the first parameter on a basis of a recognition result of an angle at which the finger is inclined in a horizontal direction to a reference plane perpendicular to the horizontal surface of the object,
  wherein the inclination of the finger with respect to the object includes an angle at which the finger is inclined in the vertical direction with respect to the surface the object.

20. A non-transitory computer-readable medium having embodied thereon a program, which when executed by a computer causes the computer to execute a method, the method comprising:
  acquiring a recognition result of an inclination of a finger with respect to an object when the finger is recognized to be touching a surface of the object;
  changing a value of a parameter related to a process to be executed on a basis of the recognition result;

changing, when a plurality of fingers are recognized to be touching the object, a value of one parameter on a basis of a recognition result of an angle at which one finger of the plurality of fingers is inclined in a vertical direction with respect to the surface of the object; and changing a value of a first parameter on a basis of a recognition result of the angle at which the finger is inclined in the vertical direction to a horizontal surface of the object and change a value of a second parameter different from the first parameter on a basis of a recognition result of an angle at which the finger is inclined in a horizontal direction to a reference plane perpendicular to the horizontal surface of the object, wherein the inclination of the finger with respect to the object includes an angle at which the finger is inclined in the vertical direction with respect to the surface the object.

* * * * *